US011009715B2

(12) United States Patent
Lochner et al.

(10) Patent No.: US 11,009,715 B2
(45) Date of Patent: May 18, 2021

(54) METHODS AND SYSTEMS FOR FITTING HEADS-UP DISPLAY TO USER

(71) Applicant: Google LLC, Mountain View, CA (US)

(72) Inventors: Samuel Jewell Lochner, Kitchener (CA); Sui Tong Tang, Waterloo (CA); Kevin R. Moule, Kitchener (CA); Lukas Rezek, Kitchener (CA); Ehsan Parvizi, Waterloo (CA); Idris S. Aleem, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/567,204

(22) Filed: Sep. 11, 2019

(65) Prior Publication Data

US 2020/0081260 A1    Mar. 12, 2020

Related U.S. Application Data

(60) Provisional application No. 62/730,423, filed on Sep. 12, 2018.

(51) Int. Cl.
*G09G 5/00*   (2006.01)
*G02B 27/01*   (2006.01)
*G02B 27/00*   (2006.01)
*G06K 9/00*   (2006.01)

(52) U.S. Cl.
CPC ..... *G02B 27/0179* (2013.01); *G02B 27/0093* (2013.01); *G02B 27/017* (2013.01); *G06K 9/00248* (2013.01); *G06K 9/00281* (2013.01); *G02B 2027/0178* (2013.01); *G02B 2027/0187* (2013.01)

(58) Field of Classification Search
CPC ............ G02B 27/0179; G02B 27/0093; G02B 27/017; G06K 9/00248
USPC .............................................................. 345/8
See application file for complete search history.

(56) References Cited

U.S. PATENT DOCUMENTS

| | | | |
|---|---|---|---|
| 2016/0299360 A1* | 10/2016 | Fonte | B29D 12/02 |
| 2017/0031435 A1* | 2/2017 | Raffle | G02B 27/017 |
| 2017/0270348 A1* | 9/2017 | Morgana | H04N 1/00244 |
| 2018/0129058 A1* | 5/2018 | Morrison | G02B 5/32 |
| 2018/0336720 A1* | 11/2018 | Larkins | G06T 19/00 |
| 2019/0146243 A1* | 5/2019 | Parandian | G06Q 30/0633 |
| | | | 351/159.75 |
| 2019/0347522 A1* | 11/2019 | Nir | G06K 9/6256 |

* cited by examiner

*Primary Examiner* — Jonathan M Blancha

(57) ABSTRACT

Systems and methods for fitting a wearable heads-up display (WHUD) to a subject are described. Imaging data representative of at least a portion of the subject's head with one or more gaze positions of the eyes is obtained from a plurality of cameras. One or more models representative of the subject's head are generated and a set of features is recognized in the one or more models. One or more models of the WHUD are also obtained based on WHUD data stored in memory. One or more simulations are performed positioning one or more WHUD models in proximity to at least one subject model based at least in part on the set of features recognized in the subject model. A fit of a WHUD to the subject is evaluated based at least in part on a determination regarding whether the simulation satisfies one or more of a set of criteria.

20 Claims, 15 Drawing Sheets

METHODS AND SYSTEMS FOR FITTING HEADS-UP DISPLAY TO USER

BACKGROUND

Technical Field

The present disclosure relates to methods and systems to fit head worn heads-up display systems to a particular user.

Description of the Related Art

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to head-worn or face-worn devices (e.g., eyewear), however, users also care about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal or do not fit well to a user's head. Most wearable heads-up displays presented to date employ large display components and, as a result, most wearable heads-up displays presented to date are considerably bulkier and less stylish than conventional eyeglass or eyewear frames. Most wearable heads-up displays are mass produced without consideration for the features of a particular user's head and face.

A challenge in the design of at least some wearable heads-up displays is to provide a fit for the heads-up display that is customized to the user. Some wearable heads-up displays are manufactured only in a single universal design having a uniform size and style intended to accommodate all users. Users may be reluctant to wear heads-up displays of this universal design because they are bulky, appear clumsy or inelegant, and may not be suitable for a particular user's style preferences. However, due to technological constraints associated with heads-up displays, providing a heads-up display that is customized for the particular features of a user's head and face and that aligns with a user's particular style preferences remains a challenging and complex problem.

One challenge associated with designing a customized heads-up display in at least some instances is the "eyebox." The eyebox refers to the range of eye positions (relative to the device itself) over which specific content/imagery provided by a device is visible to the user. The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (e.g., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox. However, demonstrated techniques for providing a wearable heads-up display with a large eyebox generally necessitate adding more bulky optical components to the display. Technologies that enable a wearable heads-up display of minimal bulk, such as those found in prescription eyeglass frames, and that provide a large eyebox are generally lacking in the art. Moreover, it is difficult to implement a commercially viable procedure for customizing a heads-up display having minimal bulk to a particular user.

DETAILED DESCRIPTION

Figure 1:
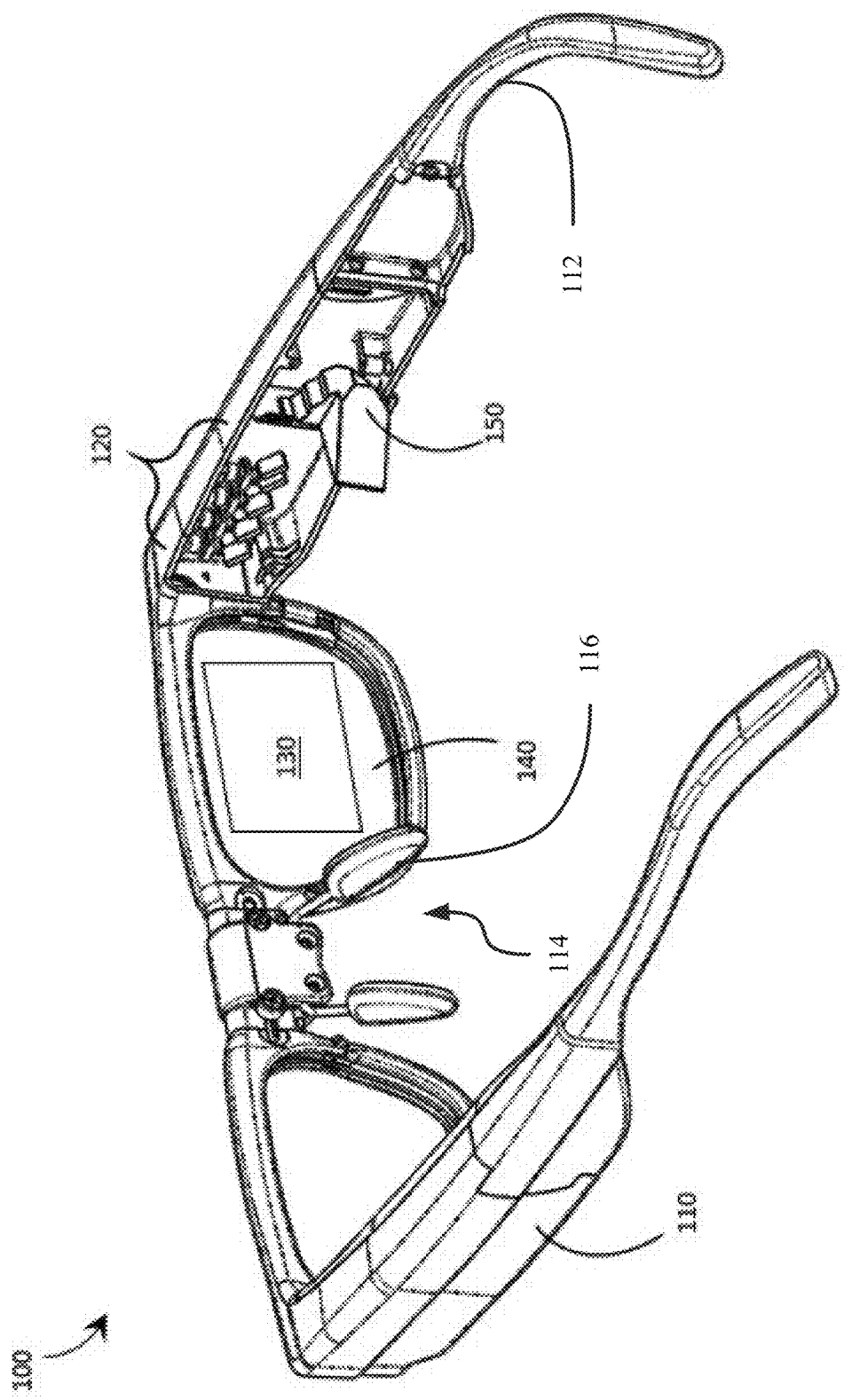
FIG. 1 is a partial-cutaway perspective view of a wearable heads-up display that provides a large eyebox made up of multiple optically-replicated exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for eyebox expansion in scanning laser-based wearable heads-up displays ("WHUDs"). Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full resolution and/or field of view of the display are visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, the present systems, devices, and methods describe eyebox expansion by exit pupil replication in scanning laser-based WHUDs.

FIG. 1 is a partial-cutaway perspective view of an exemplary WHUD 100 that provides a large eyebox made up of multiple optically-replicated exit pupils in accordance with the present systems, devices, and methods. WHUD 100 includes a support structure 110 that in use is worn on the head of a user and has a general shape and appearance of an eyeglasses (e.g., sunglasses) frame. In particular, the WHUD 100 has an appearance similar or identical to styles and shapes of at least some eyeglasses. Support structure 110 carries multiple components, including: a SLP 120, a holographic combiner 130, and an optical splitter 150. Portions of SLP 120 and optical splitter 150 may be contained within an inner volume of support structure 110; however, FIG. 1 provides a partial-cutaway view in which regions of support structure 110 have been removed in order to render visible portions of SLP 120 and optical splitter 150 that may otherwise be concealed. The support structure 110 includes a pair of temple support portions 112 for supporting the WHUD 100 on ear saddles of a person's head and a bridge 114 for supporting the WHUD 110 on a person's nose. The bridge 114 may comprise a pair of opposing nose pads 116 or may be a single monolithic structure for resting on the nose.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects there between.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory.

Holographic combiner 130 is positioned within a field of view of at least one eye of the user when support structure 110 is worn on the head of the user. Holographic combiner 130 is sufficiently optically transparent to permit light from the user's environment (i.e., "environmental light") to pass through to the user's eye. In the illustrated example of FIG. 1, support structure 110 further carries a transparent eyeglass lens 140 (e.g., a prescription eyeglass lens) and holographic combiner 130 comprises at least one layer of holographic material that is adhered to, affixed to, laminated with, carried in or upon, or otherwise integrated with eyeglass lens 140. The at least one layer of holographic material may include a photopolymer film such as Bayfol® HX available from Bayer MaterialScience AG or a silver halide compound and may, for example, be integrated with transparent lens 140 using any of the techniques described in U.S. Provisional Patent Application Ser. No. 62/214,600. Holographic combiner 130 includes at least one hologram in or on the at least one layer of holographic material. With holographic combiner 130 positioned in a field of view of an eye of the user when support structure 110 is worn on the head of the user, the at least one hologram of holographic combiner 130 is positioned and oriented to redirect light originating from SLP 120 towards the eye of the user. In particular, the at least one hologram is positioned and oriented to receive light signals that originate from SLP 120 and converge those light signals to at least one exit pupil at or proximate the eye of the user.

Optical splitter 150 is positioned in an optical path between SLP 120 and holographic combiner 130. Optical splitter 150 comprises at least one optical element (e.g., at least one lens, reflector, partial reflector, prism, diffractor, diffraction grating, mirror, or other optical element, or at least one configuration, combination, and/or arrangement of such) that is arranged to receive light signals generated and output by SLP 120 and redirect each such light signal towards holographic combiner 130 effectively from one of multiple (e.g., N, where N is an integer greater than 1) spatially-separated "virtual positions" for SLP 120. Advantageously, optical splitter 150 may be a static and passive component that, without power consumption or any moving parts, receives (at a first point of incidence therein or thereon) a first light signal generated by SLP 120 and routes/redirects the first light signal along an optical path towards holographic combiner 130 that traces back to (if optical splitter 150 is ignored during trace back) one of N spatially-separated virtual positions for SLP 120. The particular one of the N spatially-separated virtual positions for SLP 120 from which the first light signal is redirected by optical splitter 150 is determined by the first point of incidence at which the first light signal is received by optical splitter 150. In other words, from the point of view of holographic combiner 130, optical splitter 150 causes at least some light signals generated by SLP 120 to appear to originate (i.e., "effectively" originate) from N spatially-separated "virtual positions" for SLP 120 as opposed to from the real position for SLP 120. Throughout this specification and the appended claims, reference is often made to one or more "virtual position(s)" such as "N spatially-separated virtual positions for a SLP." The "real position" of an object is its actual position in real, three dimensional space. A "virtual position" of an object is a position in real space at which the optics of a system cause light from the object to effectively originate even though the real position of the object may be elsewhere. In other words, the optics of the system cause light from the object to follow optical paths that would trace back, if the optics of the system were ignored during the trace back, to a "virtual position" in space that is spatially-separated from the object's "real position" in space. As a simple example, an object in front of a planar mirror has a "virtual position" on the other side of the planar mirror. A "virtual position" may be a result of one or more intervening optical element(s) in an optical path. When one or more optical element(s) redirects light signals from a SLP, a virtual position for the SLP refers to the position in real space at which the SLP would need to be located in order to provide light signals having that same trajectory without any intervening optics. The optics of the system cause the light signals to follow a trajectory that would correspond to a different point of origin if there were no such optics in the system. The light signals appear to have "effectively" originated from a different, or "virtual," position for the SLP.

Figure 2:
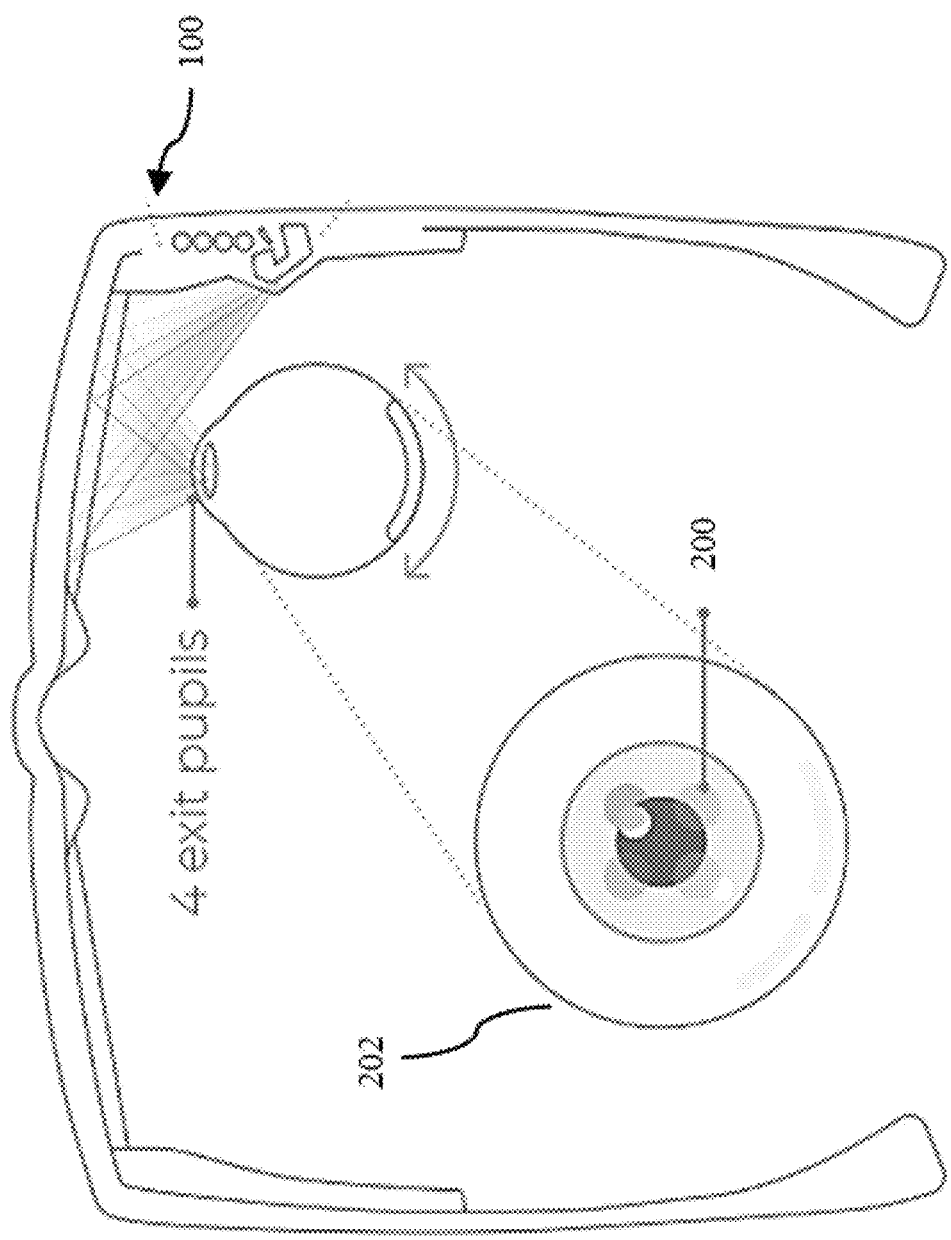
FIG. 2 is a schematic diagram showing projection of exit pupils of a wearable heads-up display onto an eye of a user.

To achieve the WHUD 100 having a larger eyebox and reduced bulk compared to other commercially available heads-up displays, the WHUD 100 employs a set of exit pupils instead of a single, large exit pupil. For example, as shown in FIG. 2, a display of the WHUD 100 includes a set of exit pupils 200*a*, 200*b*, 200*c*, 200*d* (collectively 200) projected onto the entrance pupil of the user's eye 202. To provide a high quality display on the user's eye 202, the set of exit pupils 200 should be aligned with the entrance pupil of the user's eye 202. Additionally, for the WHUD 100, a user's eyelashes may interfere with proper projection of the set of exit pupils 200 onto the user's eye 202. Technology is disclosed herein for designing a WHUD 100 customized to the user's head and facial features and that has reduced bulk and the appearance of a more traditional set of eyeglasses.

Figure 3:
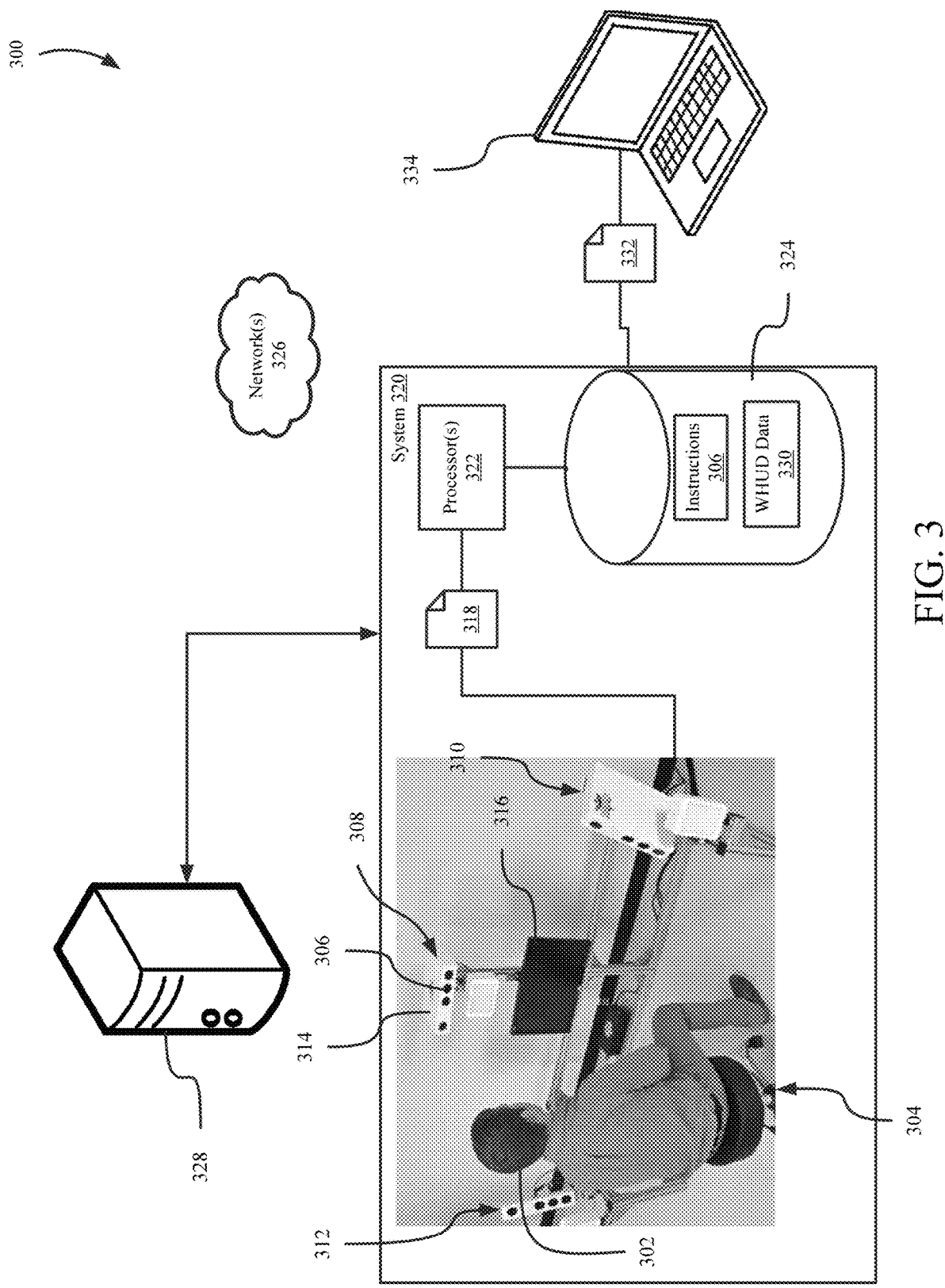
FIG. 3 is a schematic diagram of a system for fitting a wearable heads-up display to a subject according to one or more implementations.

FIG. 3 is an environment 300 for automatically determining a fit of a WHUD 100 to a head 302 of a subject according to one or more implementations. In the illustrated implementation, the environment 300 includes a plurality of cameras 306 positioned around a location 304 where a subject 304 is to be located for capturing imaging data 318 of the head 302. Other implementations may employ a single camera in a fixed position, or a single displaceable camera, e.g., carried by one or more movable fixtures. The plurality of cameras 306 are positioned in different locations around the location 304 to capture imaging data 318 including information representative of different portions of the head 302. A first set 308 of the cameras 306 is positioned in front of the location 304, a second set 310 of the cameras 306 is located on a first side of the location 304, and a third set 312 of cameras 312 is located on a second side of the location 304 opposite to the first side. Each of the first set 308, the second set 310, and the third set 312 of the cameras 306 may be housed within a respective camera subsystem 314 positioned on the front or sides of the location 304. The camera subsystems 314 may include controllers that interact with the cameras 306 to perform image capturing operations described herein. The cameras 306 may include one or more infrared camera(s) and the camera subsystems 314 may include one or more infrared light sources, such as one or more infrared speckle projector(s). The illustrated implementation of environment 300 also includes a display 316 positioned in front of the location 304. The display 316 is an example of a mechanism that provides feedback and/or instructions to guide the subject through a process of obtaining the imaging data 318. The environment 300 may include indicators that are operable to indicate a point at which the subject should gaze during the capture of imaging data 318. The environment 300 may further include speakers for providing audio to facilitate the capture of imaging data 318, e.g., by providing audio indicating when one or more of the cameras 306 will capture imaging data 318.

The environment 300 includes a processor-based system 320 including one or more processors 322 and memory 324 storing a set of instructions 326 that, as a result of execution by the one or more processors 322, cause the system 320 to perform the operations described herein. The memory 324 includes one or more types of data storage, such as read-only memory, random access memory, solid state memory, redundant array of independent disks (RAID), optical discs, cache memory, and magnetic tape memory, by way of non-limiting example. The system 320 is electronically communicatively coupled with the memory 324 via hard connections, such as one or more system buses. The one or more processors 322 are also electronically communicatively coupled with the cameras 306 to cause the cameras 306 to capture the imaging data 318. The one or more processors 320 are also electronically communicatively coupled with the display 316 and cause the display 316 to present instructions to the subject and/or information guiding the subject to facilitate the system 320 to obtain imaging data 318 appropriate to determine a fit of the WHUD 100. The system 320 may be communicatively electronically coupled to the indicators and/or speakers in the environment, which the system 320 may control to facilitate capture of the imaging data 318.

The imaging data 318 may include data for a plurality of imaging events taken at a plurality of different times. Each of the imaging events corresponds to a plurality of images taken by a plurality of the cameras 306 at the same time. The plurality of images taken at the same time may be used to construct a model (e.g., a 3D model) of the subject's head 302, including the subject's eyes, while the subject is gazing at a particular point. A plurality of models (e.g., 3D models) is constructed each of which corresponds to a different gaze point at which the subject is focusing on during an imaging event. The pluralities of models are used to recognize various features of the subject's head 302 to determine a fit of a WHUD 100 thereto.

The imaging data 318 is used to determine the fit of the WHUD 100 according to one or more implementations. In some implementations, the system 320 may process the imaging data 318 via the one or more processors 322 to perform one or more operations for determining the fit of a WHUD 100 to a subject, as described herein. In some implementations, the system 320 may provide the imaging data 318 over a network 326 to a remote system 328 at a location remote to the system 320. The system 320 may include one or more communication interfaces (not pictured) for facilitating wired and/or wireless communication with other devices. Examples of such communication interfaces include network adapters, Wi-Fi transceivers, fiber optic transceivers, and the like. The network 326 may be private (e.g., secured or unsecured local area networks, cellular networks, serial connection) or public (e.g., the Internet, mesh networks, wide area networks). The remote system 328 includes one or more processor-based devices, such as Web servers, that process the imaging data 318 to perform one or more operations for determining the fit of a WHUD 100 to a subject.

Determining the fit of a WHUD 100 to a subject involves performance of a set of operations including generating, using the imaging data 318 obtained, a plurality of models of at least a portion of the subject's head 302. The set of operations also include recognizing features of the subject's head 302 using one or more of the plurality of models and/or one or more of the two-dimensional images captured by the camera(s). The operations also include generating a simulation of the head 302 and simulations of different configurations or models of the WHUD 100 and/or components thereof relative to the simulation of the head 302. WHUD data 330 is stored in the memory 324 may include data regarding the size and shape of components of WHUDs 100 (e.g., dimensions of temple support portions 112, dimensions of front frame of support structure 110, dimensions of bridge 114). The WHUD data 330 may include information regarding the optics of optical components (e.g., SLP 120, holographic combiner 130, optical splitter 150) for simulating generation of the exit pupils 200 with corresponding configurations of a WHUD 100. Simulations of the WHUDs 100 may be generated based at least in part on the WHUD data 330, as described herein. Based at least in part on the simulations of the WHUD(s) 100 relative to the simulation of the head 302, the set of operations include determining a model or configuration of a WHUD 100 that is an appropriate fit for the subject's head 302. An appropriate fit is determined as a fit of the WHUD 100 to the subject's head 302 in which the exit pupils 200 are aligned with the entrance pupil of the subject's eye 202 when the temple support portions 112 of the support structure 110 are supported by the subject's ear saddles and the bridge 114 is supported by the subject's nose.

As a result of determining a fit of a WHUD 100 to the subject's head 302, the system 320 may generate WHUD configuration information 332 regarding one or more configurations of the WHUD 100 that are a fit for the subject. For instance, the WHUD configuration information 330 may specify one or more configurations of WHUDs 100 that would be an appropriate fit for the subject's head 302. The configurations may specify sets of components that could be combined to form a WHUD 100 that would be an appropriate fit for the subject's head 302. The configuration information 330 may specify models of the WHUD 100 that would be an appropriate fit for the subject's head 302. The configuration information 330 may also specify modifications for WHUD 100 models or components that would provide an appropriate fit of the WHUD 100 for the subject's head 302, including without limitation recommendations for post-manufacturing adjustments to, for example, the nose pads and/or temple arms (i.e., over and behind the ear) of the WHUD 100. The set of operations for determining the fit may also include optimizing the fit of the WHUD 100 to the subject's head 302, such as by determining a "best fit" model or configuration of a WHUD 100 and/or modifications to components of the WHUD 100 that would improve the comfort or performance of the WHUD 100 for the subject. Information representative of such optimizations may be included in the WHUD configuration information 332. The WHUD configuration information 332 may be generated and provided to a user device 334 over the network 326. The user device 334 is a processor-based device associated with an entity, such an employee or supervisor, authorized to facilitate determining a fit of the WHUD 100 to the subject's head 302. The configuration information, in some implementations, may be presented to the subject, e.g., via the display 316 or to an account associated with the subject. Based on the configuration information 332, a configuration for a WHUD 100 may be selected for the subject.

Figure 4A:
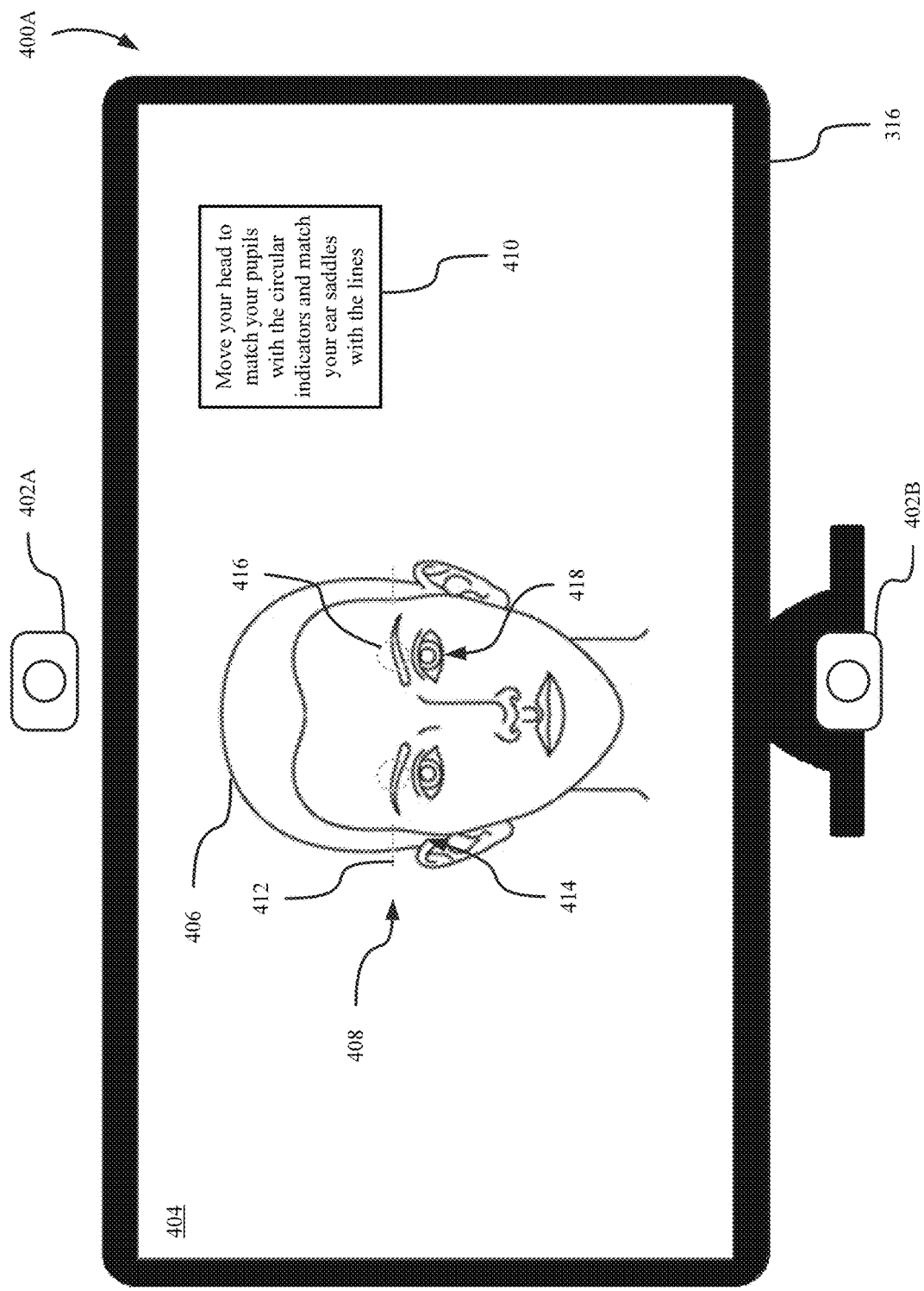
FIG. 4A front elevational view of a portion of the system of FIG. 3 at a first time during an operation to capture imaging data of a head of a subject according to one or more implementations.

FIGS. 4A through 4D show a process implemented by the system 320 to guide a subject through obtaining the imaging data 318. The process for obtaining the imaging data 318 involves providing instructions to the subject on the display 316 and capturing the imaging data 318 via at least some of the cameras 306. FIG. 4A shows an environment 400A including the display 316 and one or more indicators 402 positioned around the display 316. The indicators 402 include lights, such as light-emitting diodes, that indicate a location to which the subject should direct their gaze for the cameras 306 to capture imaging data 318. There may be a separate indicator 402 for each imaging event, which may comprise imaging data taken by a plurality of the cameras 306 at the same time, as described above. In the environment 400, a first indicator 402A is positioned above a display screen 404 of the display 316 and a second indicator 402B positioned below the display screen 404. There may be more than two indicators 402 in some implementations—for example, there may be two or more first indicators 402A each positioned at predetermined locations above the display screen 404 and/or there may be two or more second indicators 402B each positioned at predetermined locations below the display screen 402B. In some implementations, one or more of the indicators 402 may be part of one or more camera subsystems 314. In some implementations, one or more of the indicators 402 may be implemented by displaying an indication of a point at which the subject should gaze. In some implementations, the indicators 402 may be displayed by the display 316, or may be part of or attached to the display 316.

The display screen 404 in the environment 400A is displaying an image 406 of the subject's head 302 and an overlay for guiding the subject to position their head 302 to capture the imaging data 318. The image 406 is an image captured by one of the cameras 306 in front of the subject, such as a camera 306 in the first set of cameras 308, and displayed in real-time to the subject. The overlay 408 is a set of images superimposed over the image 406 of the subject and positioned in a fixed location in the display screen 404. The overlay 404 helps the subject to position their head 302 in a correct orientation and location relative to the cameras 306 to capture imaging data 318 for modeling the subject's head 302. A position of the overlay 408 in the display screen 404 may be determined based on, for example, positions of the cameras 306 relative to the display screen 404.

The overlay 408 includes a pair of first portions 412 for guiding the subject to position ear saddles 414 of the image 406 of the subject's head 302 to desired locations within the display screen 404. The first portions 412 in the illustrated exemplary environment 400A are straight lines extending in a generally horizontal direction relative to the center of the screen 404, although the first portions 412 may have a different appearance in some implementations. For instance, the first portions 412 may have the appearance of left and right temple arms of eyeglasses. In some implementations, the first portions 412 may have the shape of left and right ears for aligning with left and right ears of the subject's head 302.

The overlay 408 also includes a pair of second portions 416 for guiding the subject to position pupils of the image 406 of the subject's head 302 to particular locations within the display screen 404. The second portions 416 in the exemplary illustrated environment 400A respectively have an annular shape corresponding to the circular shape of the subject's pupils. The second portions 416 may have a different appearance in some implementations, such as having the appearance of irises of the eye or the appearance of eyeglass lenses that encompass the eye. The exemplary illustrated second portions 416 each have a size and shape (e.g., diameter) corresponding to the size and shape that the subject's pupils will appear to have when the subject is located at the location 304. That is, respective ones of the subject's pupils will be within corresponding second portions 416 when the subject is located at a distance away from the screen 404 and the subject's head 302 is appropriately oriented. The subject may adjust their posture, seat height, head 302 orientation, etc., to align the first portions 412 and the second portions 416 respectively with the ear saddles 414 and the pupils 418 of the image 406. In some implementations, the seat upon which the subject sits may automatically adjust its height to align the user without requiring the user to make such adjustments manually.

The overlay 408 may have appearances other than those shown or described. For instance, in some implementations, the overlay 408 may have the appearance of a pair of eyeglasses that the subject appropriately aligns with corresponding portions of their image 406. In some implementations, the screen 404 may be darkened or out-of-focus in parts other than the overlay 408 such that the subject aligns their pupils and ears or pupils and ear saddles with the in-focus or normal portions of the overlay 408.

A configuration of the overlay 408 may be determined based on data stored in the memory 324. For instance, the size, spacing, and appearance of the first portions 412 and the second portions 416 may be determined based on overlay configuration information stored in the memory 324. The overlay configuration information may, for instance, specify sizing of and/or spacing between the first portions 412, sizing of and/or spacing between the second portions 416, and spacing between the first portions 412 and the second portions 416. Such overlay configuration information may be stored as relative or absolute coordinates on the display 404. In some implementations, the instructions 306 may include executable instructions executable by the one or more processors 322 to recognize various features of the subject's head 302, such as eyes, irises, pupils, ears, ear saddles, nose, and eyelashes. In at least some of those implementations, the system 320 may determine the sizing and spacing of the first and second portions 412 and 416 based at least on corresponding spacing and sizing of corresponding facial features recognized for the subject's head 302.

The screen 404 may also display instructions 410A instructing the subject on how to position their head 302 relative to the overlay 408. The instructions 410A may be textual or may comprise one or more images illustrating the desired position of the image 406 relative to the overlay 408. For instance, the instructions 410A instruct the subject to match their ear saddles and pupils with corresponding portions of the overlay 408.

As a result of the set of conditions being satisfied for aligning the features of the subject's head 302 with the corresponding portions of the overlay 408, the system 320 may proceed to capture the imaging data 318. The system 320 may make a determination that the set of conditions for alignment are satisfied based on an automatic basis and/or by manual input. The system 320 may automatically begin obtaining imaging data 318 and as a result detect that the subject's ear saddles 414 and pupils 418 are respectively aligned with the first portions 412 and the second portions 416. In some implementations, the system 320 may receive a manual input, such as a selection on an input device, provided, for example, by an assistant or employee tasked with overseeing the image capturing process.

As a result of satisfying the set of conditions for aligning the features of the subject's head 302 with the corresponding portions of the overlay 408, the system 320 captures the imaging data 318 of the subject's head 302 in a plurality of imaging events. In each of the imaging events, the subject gazes at a different location with their eyes while keeping their head 302 in a position in which the ear saddles 414 and the pupils 418 are respectively aligned with the first portion 412 and the second portion 416 of the overlay 408. The system 320 may activate various ones of the indicators 402 or implement other visual cues for the subject to fix their gaze during the imaging events.

Figure 4B:
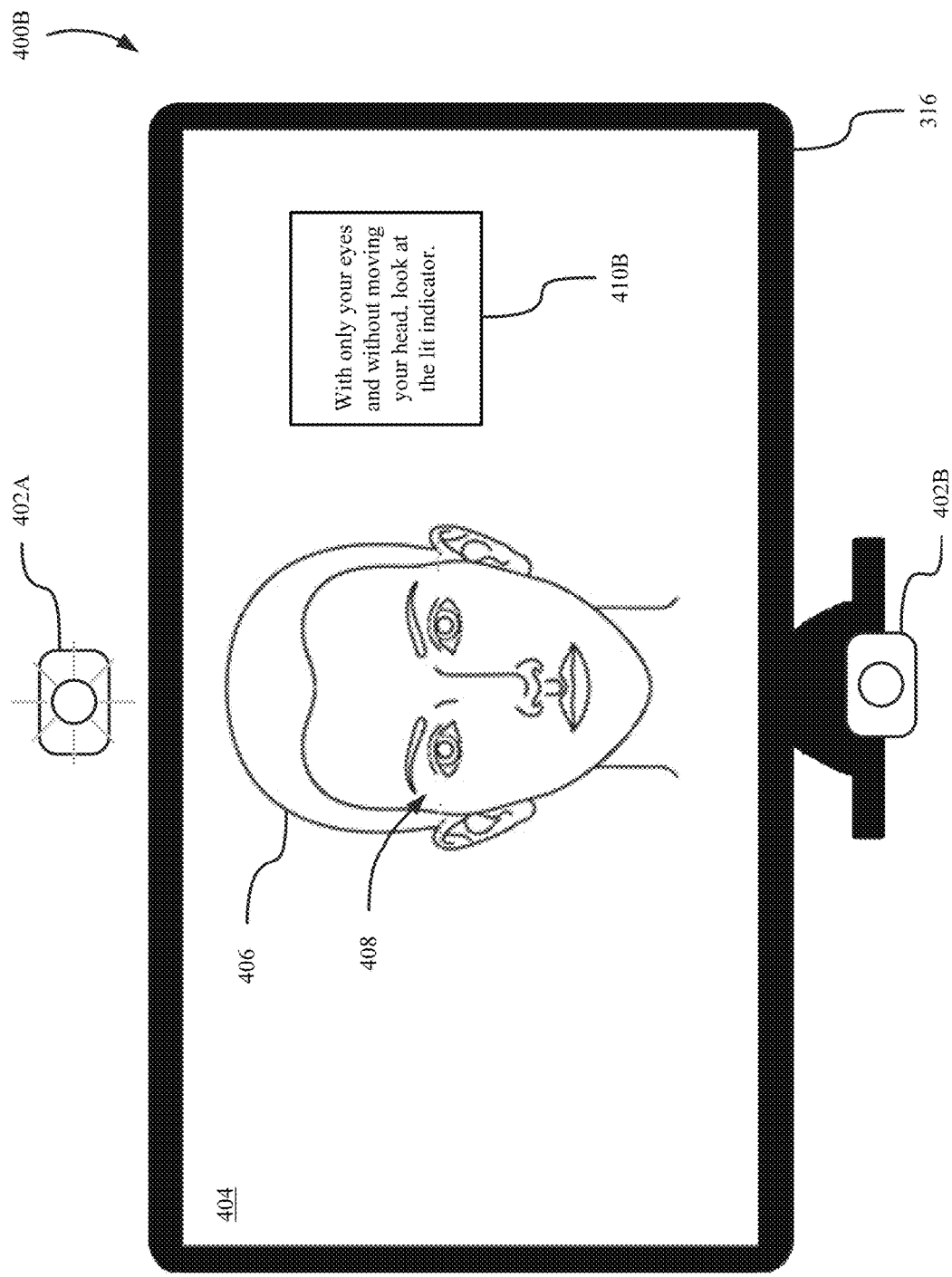
FIG. 4B is a front elevational view of a portion of the system of FIG. 3 at a second time during the operation to capture imaging data of the head of the head according to one or more implementations.
Figure 4C:
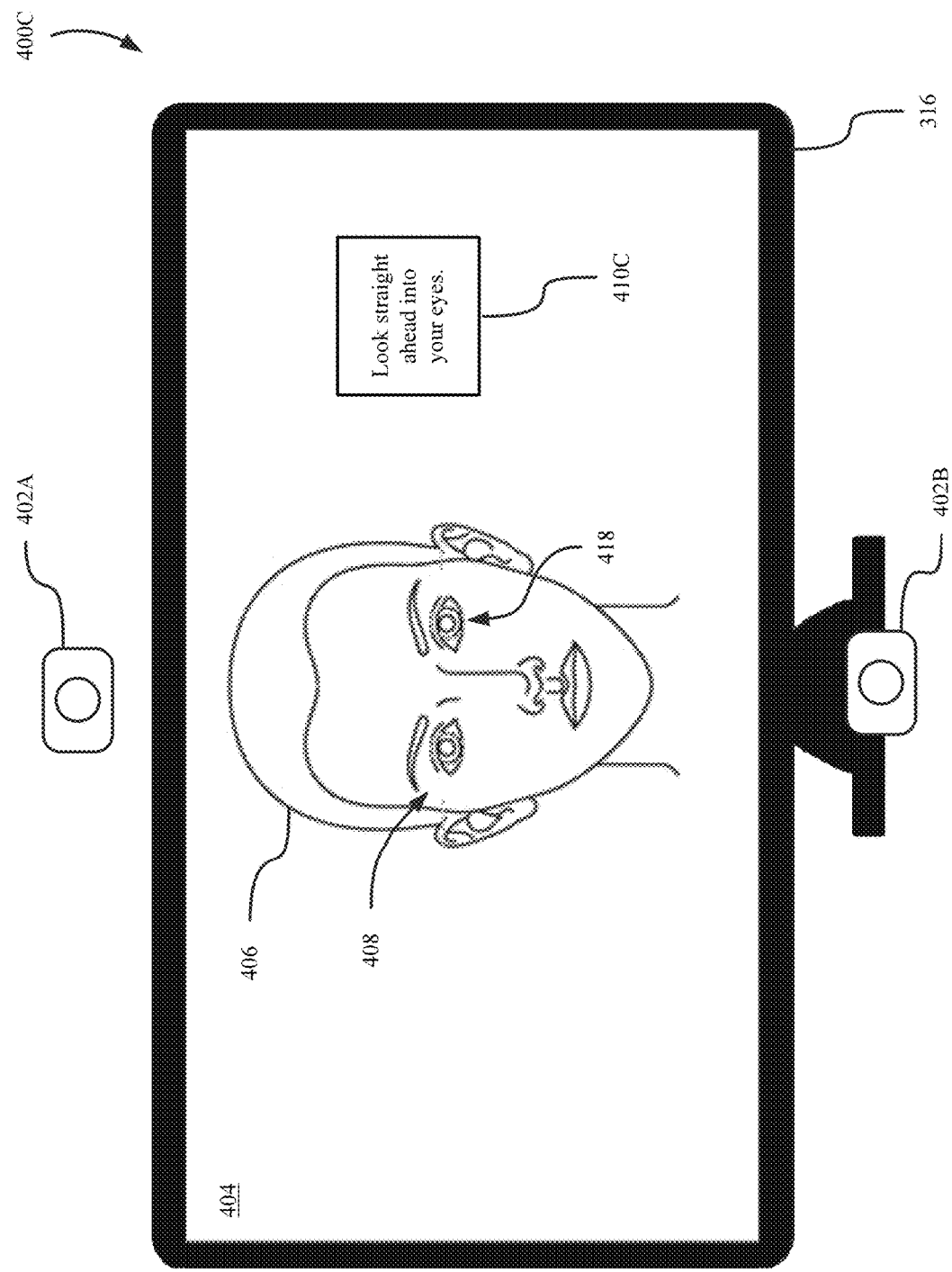
FIG. 4C is a front elevational view of a portion of the system of FIG. 3 at a third time during the operation to capture imaging data of the head of the subject according to one or more implementations.
Figure 4D:
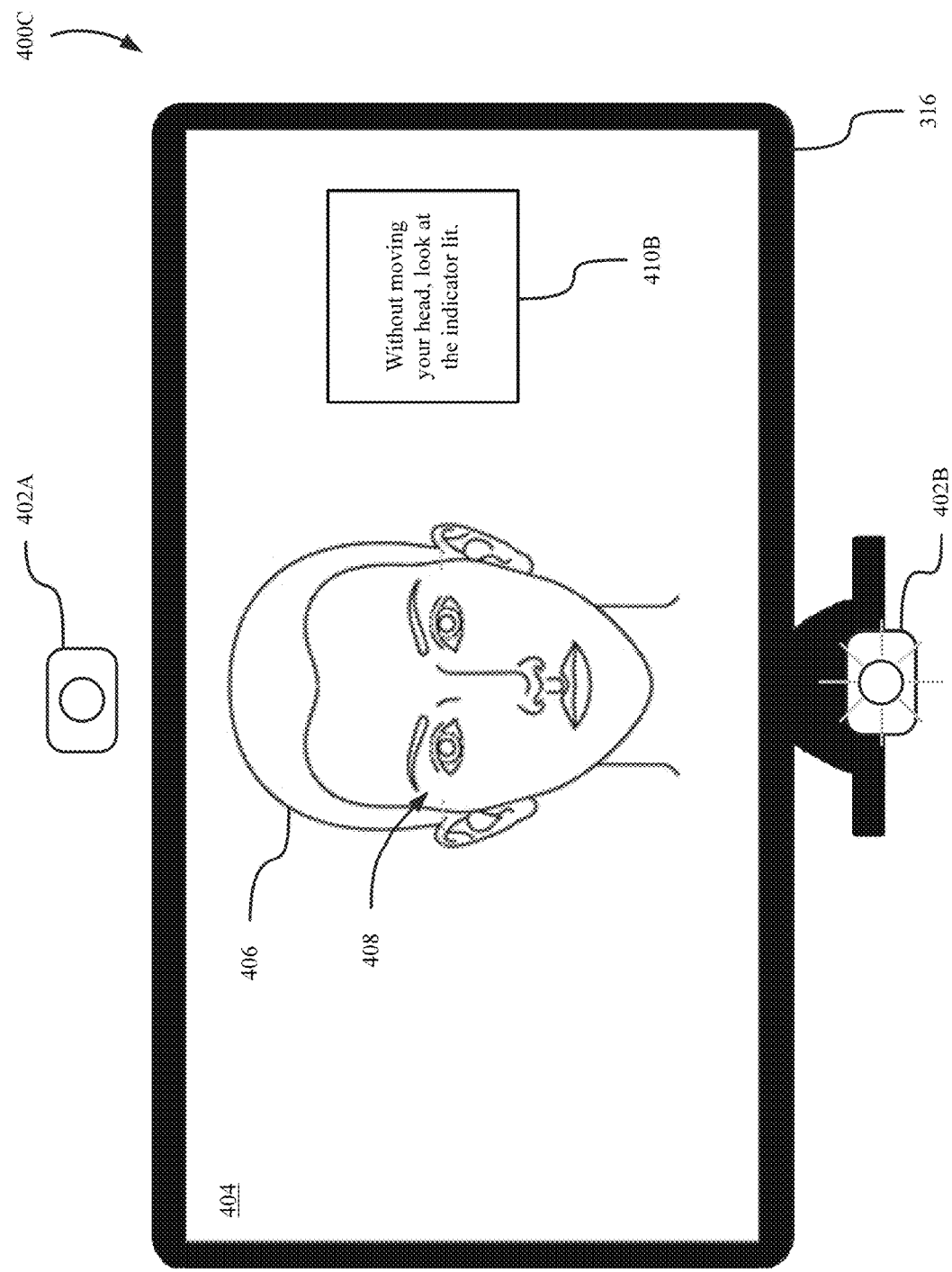
FIG. 4D is a front elevational view of a portion of the system of FIG. 3 at a fourth time during the operation to capture imaging data of the head of the subject according to one or more implementations.

FIGS. 4B through 4D depict a plurality of imaging events in which portions of the imaging data 318 are captured. The imaging events are not necessarily performed in the order presented and may include additional imaging events not depicted. FIG. 4B shows an environment 400B in which a first set of imaging data 318 is captured as a result of the set of conditions being satisfied for aligning the features of the subject's head 302 with the corresponding portions of the overlay 408. In the environment 400B, the system 320 instructs the subject to gaze at a particular location and captures the first set of imaging data 318. In some implementations, the system 320 may instruct the subject regarding where to gaze using instructions 410B presented on the screen 404. In some implementations, the system 320 may provide audio instructions via connected speakers instructing the subject to gaze at a particular location. At the same time, the system 320 may cause illumination of the first indicator 402A located above the display 316. Thereafter, the system 320 controls at least a set of the plurality of cameras 306 to capture the first set of imaging data 318 while the subject is gazing at the indicator 402A. As described below in further detail, the first set of imaging data 318 is used to generate a first model of the subject's head 302 having eyes gazing upward along a given plane that is oriented at an acute angle with respect to the ground.

FIG. 4C shows an environment 400C in which a second set of imaging data 318 is captured as a result of the set of conditions being satisfied for aligning the features of the subject's head 302 with the corresponding portions of the overlay 408. In the environment 400C, the system 320 instructs the subject to look straight ahead and captures the second set of imaging data 318. The subject may, for instance, be instructed via on-screen instructions 410C to look straight ahead into the pupils 418 of the image 406. In some implementations, the system 320 may cause an indicator to be displayed on the screen 404 over or instead of the image 406 and instruct the subject to direct their gaze at the on-screen indicator. Thereafter, the system 320 controls at least a set of the plurality of cameras 306 to capture the second set of imaging data 318 while the subject is gazing at the second gaze point. As described below in further detail, the second set of imaging data 318 is used to generate a second model of the subject's head 302 having eyes gazing at the second gaze point (e.g., straight ahead). This second model may also be referred to herein as an "in-plane" model.

FIG. 4D shows an environment 400D in which a third set of imaging data 318 is captured as a result of the set of conditions being satisfied for aligning the features of the subject's head 302 with the corresponding portions of the overlay 408. In the environment 400C, the system 320 instructs the subject to gaze at a particular location and captures the third set of imaging data 318. In some implementations, the system 320 may instruct the subject regarding where to gaze using instructions 410D presented on the screen 404. In some implementations, the system 320 may provide audio instructions via connected speakers instructing the subject to gaze at a particular location; in this instance, the second indicator 402B. At the same time, the system 320 may cause illumination of the second indicator 402B located above the display 316. Thereafter, the system 320 controls at least a set of the plurality of cameras 306 to capture the third set of imaging data 318 while the subject is gazing at the second indicator 402B. As described below in further detail, the third set of imaging data 318 is used to generate a third model of the subject's head 302 having eyes gazing downward along a given plane that is oriented at an acute angle with respect to the ground.

The system 320 may be configured to capture additional sets of imaging data 318. For instance, the system 320 may perform imaging events capturing one or more additional sets of imaging data 318 in which the subject's eyes are gazing upward along a given plane that has an acute angle different than the angle of the given plane corresponding to the first set of the imaging data 318. As another example, the system 320 may perform imaging events capturing one or more additional sets of imaging data 318 in which the subject's eyes are gazing downward along a given plane that has an acute angle different than the angle of the given plane corresponding to the third set of the imaging data 318. In some implementations, the system 320 may perform a single imaging event capturing the second set of imaging data 318 in which the subject's eyes are gazing straight ahead.

As a result of capturing one or more sets of imaging data 318, the system 320 proceeds to generate one or more three-dimensional models of the subject's head 302. The three-dimensional models generated represent portions of the subject's head 302, including the subject's face and ears, to use for detecting certain features of the subject's head 302. In some implementations, the models are generated by the system 320 using the imaging data 318. In some implementations, the system 320 may provide the imaging data 318 to the remote system 328, which generates the one or more three-dimensional models and sends the models generated back to the system 320. The system 320 and/or remote system 328 may generate the models by using a plurality of processors in parallel to speed up the process and/or offload work. For instance, one set of processors may generate a first model while a second set of processors generates a second model. In some implementations, the system 320 may send two or more sets of the imaging data 318 to the remote system 328, which implements parallel processing to generate and provide a model for each set of the imaging data 318 to the system 320.

Individual sets of imaging data 318 may be used to generate a corresponding three-dimensional model of the subject's head 302. The second set of imaging data 318, obtained when the subject is gazing at the second gaze point (e.g., straight ahead), is used to generate the in-plane model of the subject's head 302. The first set of imaging data 318, obtained when the subject is gazing upward, is used to generate a first model of the subject's head 302. The third set of imaging data 318, obtained when the subject is gazing downward, is used to generate a third model of the subject's head 302. Additional sets of imaging data 318 may be used to generate additional models. For instance, fourth and fifth models of the subject's head 302 may be generated using fourth and fifth sets of imaging data 318 that are obtained when the subject is gazing downward at acute angles different than the acute angle at which the third set of imaging data 318 was obtained.

The system 320 (or remote system 328) may analyze the different models generated to detect certain features of the subject's head 302. The in-plane model may be used to detect four points in the model: pupil centers of the left and right eyes, and ear saddle points of the left and right ear. By detecting the pupil centers and ear saddle points, the system 320 can define a glasses plane passing through the four points. In some implementations, it may be sufficient for the system 320 to detect the pupil centers and one of the left and right ear saddle points. The in-plane model may also be used to detect sideburns on the subject's head 302. The system 320 may register the presence of sideburns in the glasses plane as obstructions which the temple support portions 112 of the WHUD 100 should be routed around. By detecting sideburns in the in-plane model, the system 320 can accurately determine areas in the model that the temple support portions 112 can pass through, rather than be routed around. The system 320 may detect sideburns using hair detection algorithms and skin map algorithms, and/or using machine learning segmentation models.

The system 320 may use a plurality of the two-dimensional images captured and/or a plurality of the three-dimensional models generated to detect eyelashes of the subject's head 302. Eyelashes can interrupt the optical path of the laser light as it travels from the optical splitter 150 to the holographic combiner 130 and/or as it travels from the holographic combiner 130 to the eye of the user, either or both of which can significantly impede a user's ability to see the display of the laser spot. In particular, because laser beams traveling from the optical splitter 150 to the holographic combiner 130 are diverging, a single eyelash may occlude a significant portion of the laser beam. The plurality of three-dimensional models, which correspond to different gaze directions of a subject, help the system 320 to determine a region around the eyelashes of the subject that a beam path of the optical splitter 150 should avoid. In some implementations, the plurality of models used to determine the region around the eyelashes comprise the in-plane model, a model corresponding to the subject gazing upward at a given angle, and three models corresponding to the subject gazing downward at three different angles. In other implementations, the region around the eyelashes may be determined using only a single model (e.g., the in-plane model). In implementations in which the region around the eyelashes is determined using only a single model, such determination may employ or be at least partially based upon an approximation of how the eyelashes move with gaze. For example, respective sets of models having different gaze points may be analyzed to generate an approximation, representation, or understanding of how the eyelashes move with gaze and such approximation, representation, of understanding may be applied to determine the region around the eyelashes using only a single model.

Next, one or more simulations are performed to determine one or more configurations, if any, of the WHUDs 100 that fit the subject's head 302. In particular, one or more three-dimensional models of the WHUD 100 may be applied to one or more models of the subject's head 302 to determine a fit, if any, of the configurations of the WHUD 100 to the subject's head 302. Referring back to FIG. 3, WHUD data 330 stored in the memory 324 may be used to determine a fit of the WHUDs 100, if any, to the subject's head 302. In some implementations, the WHUD data 330 may include information representative of the dimensions of WHUDs 100 or components thereof, which may be used to generate three-dimensional models of the WHUDs 100. For instance, using the WHUD data 330, a first model of a WHUD 100 may be generated using a support structure 110 having a first set of dimensions in combination with an optical splitter 150 having a first set of optical characteristics, and a second model of the WHUD 100 may be generated using a support structure 110 having a second set of dimensions in combination with an optical splitter 150 having a second set of optical characteristics. In some implementations, the WHUD data 330 may include information representative of various three-dimensional models of one or more configurations of the WHUD 100 or components thereof that may be assembled to form a model of the WHUD 100.

The first model and the second model of the WHUD 100 may be applied to the in-plane model of the subject's head 302 to determine whether there is a fit. FIGS. 5A through 5E show representations of a configuration of the WHUD 100 to a model of the subject's head 302. The simulations are performed in a virtual 3D environment in which virtual representations of physical objects in the real-world may be represented. In at least some implementations, two or more virtual representations may be included in the virtual 3D environment to determine relationships between various parts of the virtual representations corresponding to physical objects. For example, in the virtual 3D environment, features of a first virtual representation representative of a first physical object may be positioned adjacent to corresponding features of a second virtual representation representative of a second physical object to determine the fit or compatibility of the first physical object with the second physical object. Representing virtual representations in the virtual 3D environment may include modelling features of the virtual representations without visual display of the virtual representations via a display.

Figure 5A:
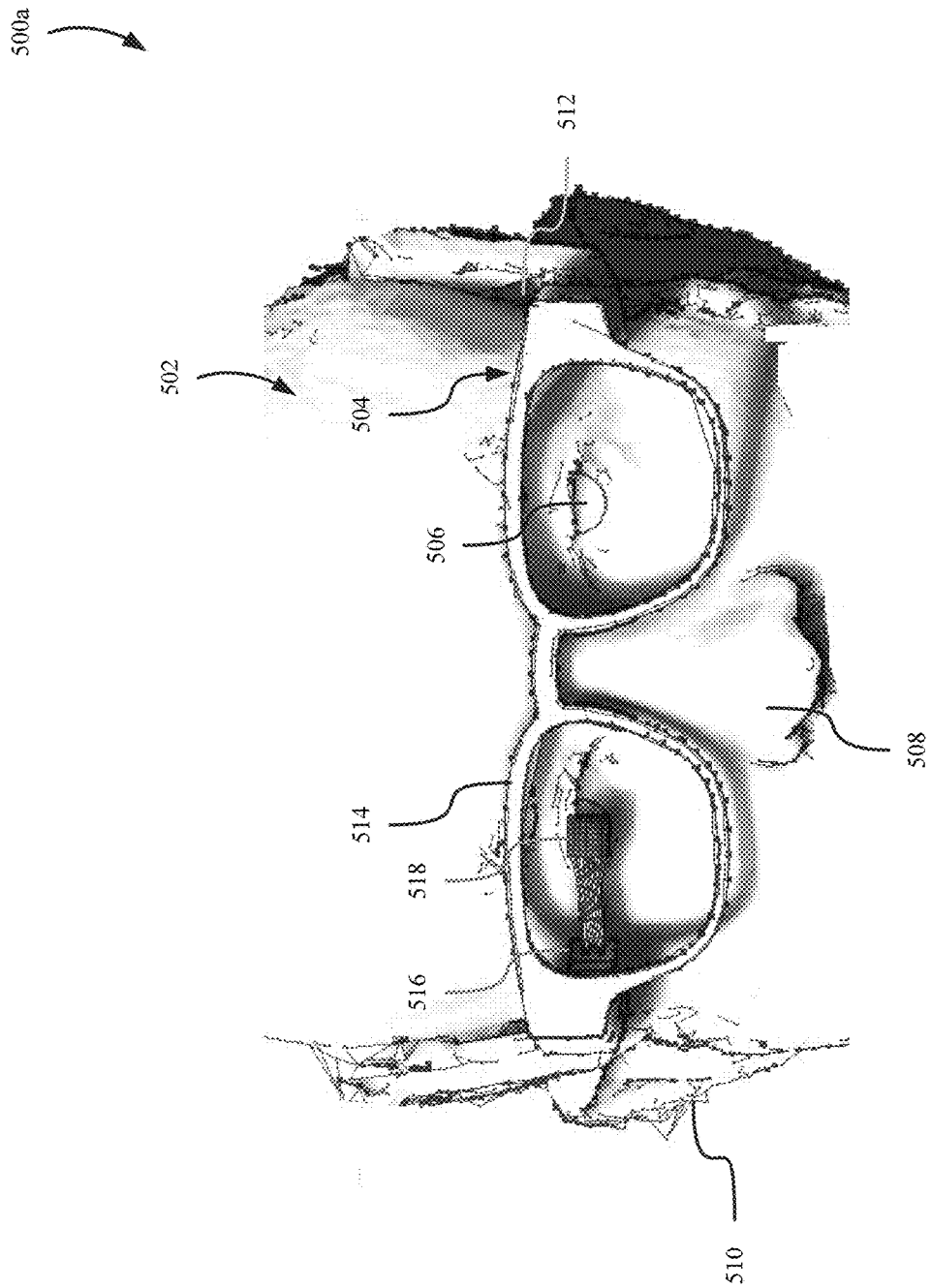
FIG. 5A is a front elevational view that shows a first aspect of a representation model representative of a configuration of the wearable heads-up display proximate to a model representative of the head of the subject according to on e or more implementations.

Although only an upper portion of the head 302 is depicted in the virtual 3D environment, the model(s) generated may include other portions of the subject's head 302 not depicted. FIG. 5A shows a first aspect 500a of a virtual 3D environment 500 simulating a model 504 of a configuration of the WHUD 100 relative to a model 502 of the subject's head 302. The head model 502 includes representations 506 of the subject's pupils, a representation 508 of the subject's nose, representations 510 of the subject's ears, and representations 512 of the subject's sideburns. The WHUD model 504 comprises a representation 514 of the support structure 110, and a representation 516 of the optical splitter 150. The pupil representations 506 correspond to an area of the eye including both the iris and the pupil, as the iris may dilate or contract to expand or contract the pupil.

A representation 518 of an optical path of the laser light emitted from the optical splitter 150 and reflected from the holographic combiner 130 is also depicted in FIG. 5A. The optical path representation 518 is generated by tracing the path of laser signals that would be generated by laser light of the WHUD 100. In particular, the system 320 or remote system 328 may determine the path that one or more laser signals would take as a result of being emitted from the optical splitter 150. The determination regarding the path of the one or more laser signals may be based at least in part on the WHUD data 330. For instance, the WHUD data 330 may include information regarding optical characteristics of the SLP 120, the holographic combiner 130, and/or the optical splitter 150. Using the information regarding the optical characteristics, the system 320 or remote system 328 may trace the path of the laser signals emitted from the optical splitter 150 and redirected from the holographic combiner 130. In some implementations, the WHUD data 330 may include predetermined information specifying the path of the laser signals based on the configuration of the WHUD 100 (e.g., size of components, type of components). The representation 518 of the optical path of the laser light may be generated as part of the WHUD model 504, or may be generated or determined as part of a separate process.

Figure 5B:
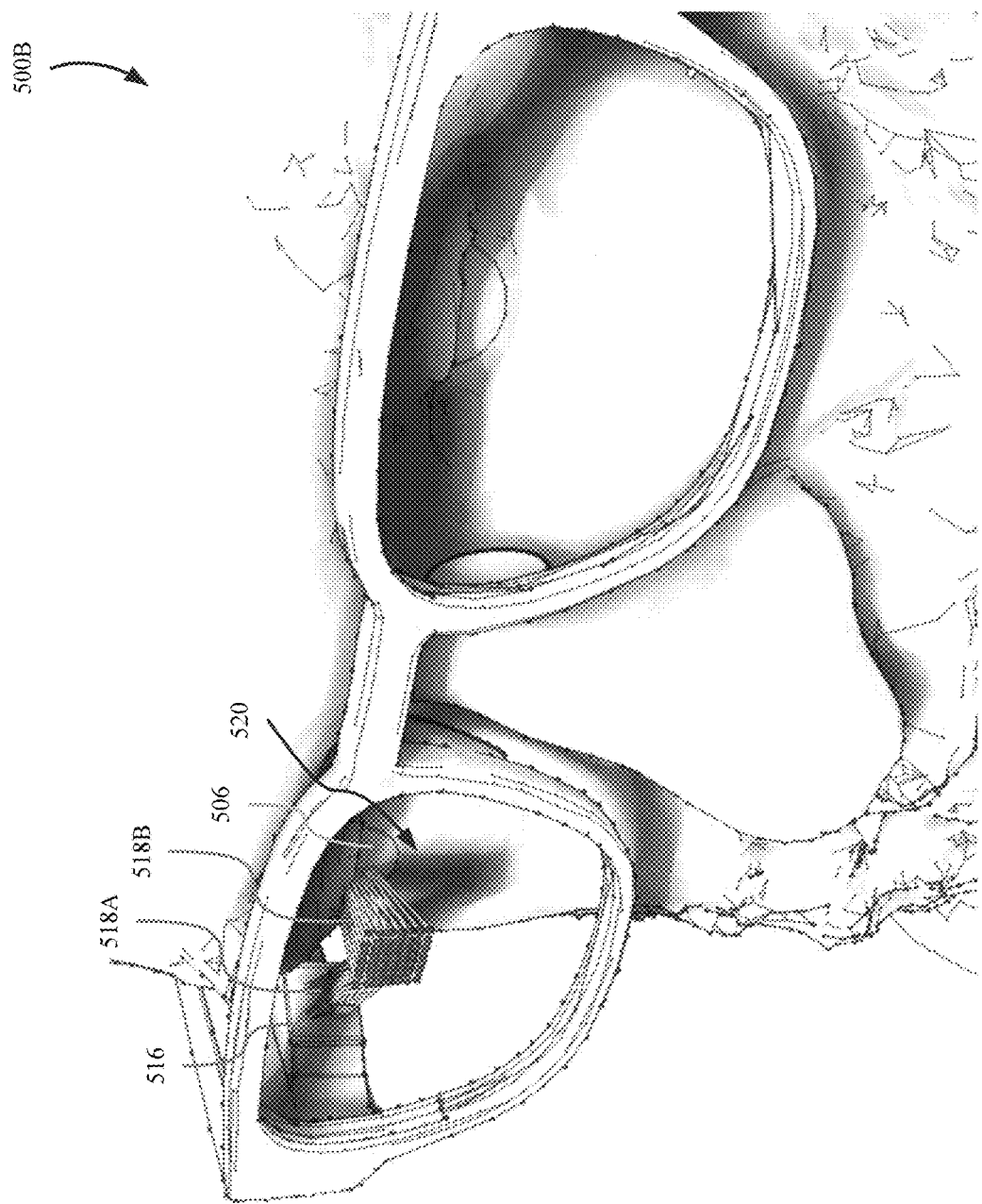
FIG. 5B is a front, top, right isometric view that shows a second aspect of the representation model of FIG. 5A.

FIG. 5B shows a second aspect 500b of the virtual 3D environment 500 simulating the WHUD model 504 relative to the head model 502. In the aspect 500b, it can be determined whether the optical path representation 518 is incident upon the pupil representation 506 such that the subject would adequately perceive images presented by the WHUD 100. In particular, the simulation indicates whether a first portion 518A of the optical path representation 518, which is the portion before the laser light is reflected from a representation 520 of the holographic combiner 130, passes through the region representative of the subject's eyelashes. The simulation also indicates whether a second portion 518B of the optical path representation 518, which is the portion of laser light reflected from the holographic combiner 130, is incident upon a central portion of the pupil representation 506. The system 320 may make the determination of whether the WHUD model 504 relative to the head model 506 represents an appropriate fit based on at least the first and second portions 518A and 518B of the optical path representation 518. In some implementations, the system 320 may make the determination of whether the WHUD model 504 relative to the head model 506 represents an appropriate fit based additionally on aesthetics and/or style (e.g., aesthetic parameters such as frame/lens size relative to head/eye size, frame width relative to head width, frame height relative to head length, ad similar).

Figure 5C:
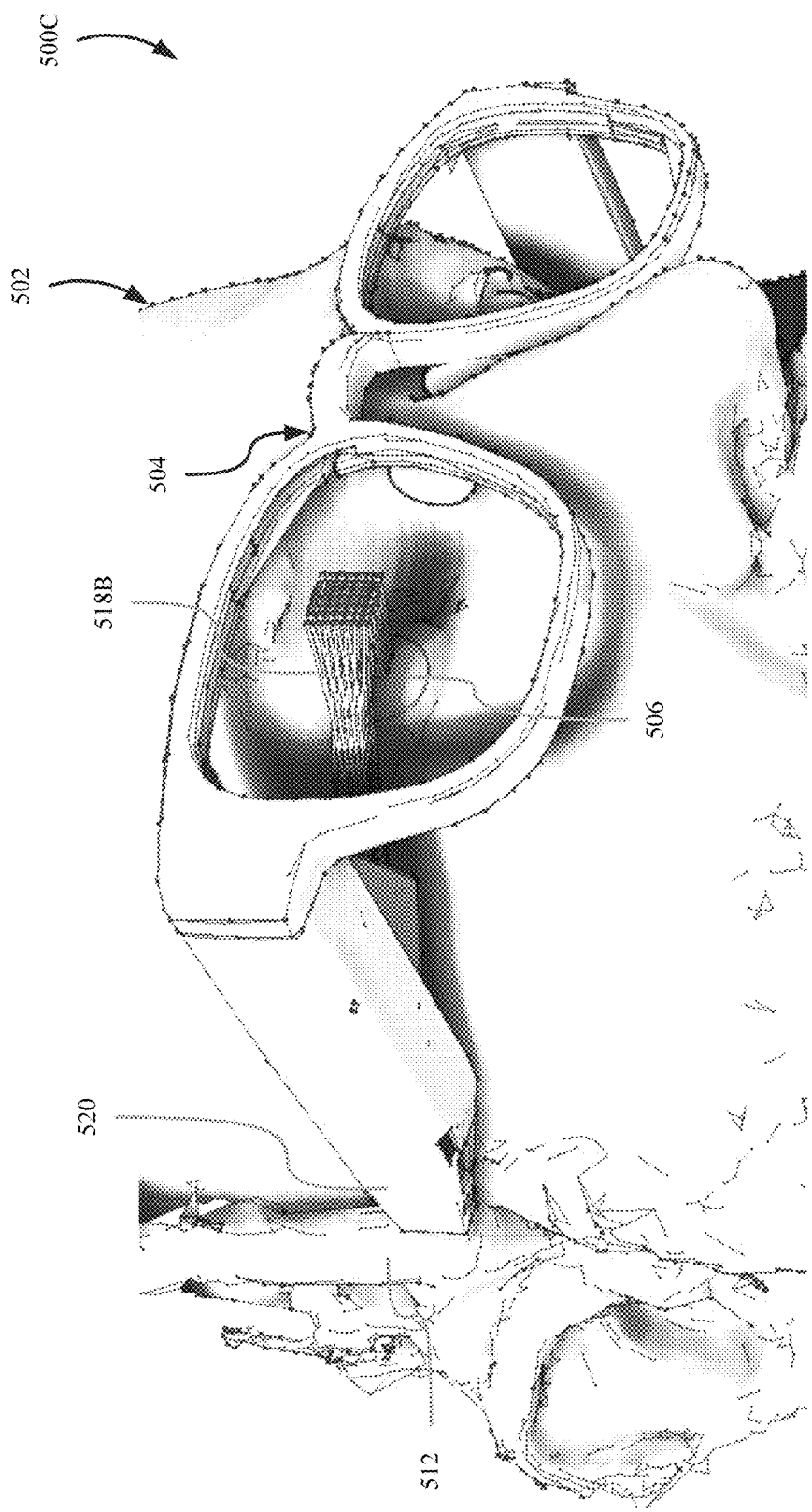
FIG. 5C is a front, bottom, left isometric view that shows a third aspect of the representation model of FIG. 5A.
Figure 5D:
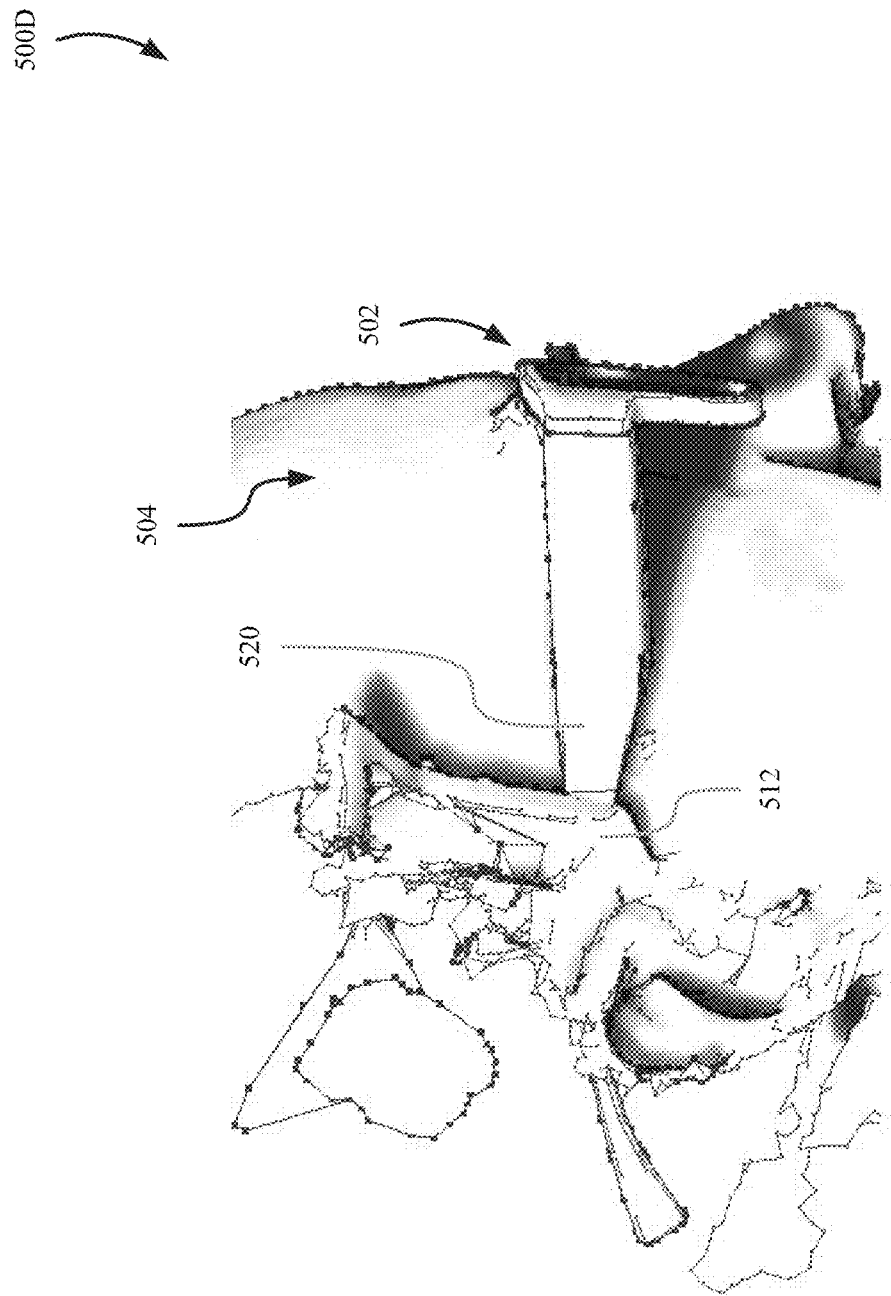
FIG. 5D is a left side elevational view, that corresponds to a right side of the head of the subject, and that shows a fourth aspect of the representation model of FIG. 5A.
Figure 5E:
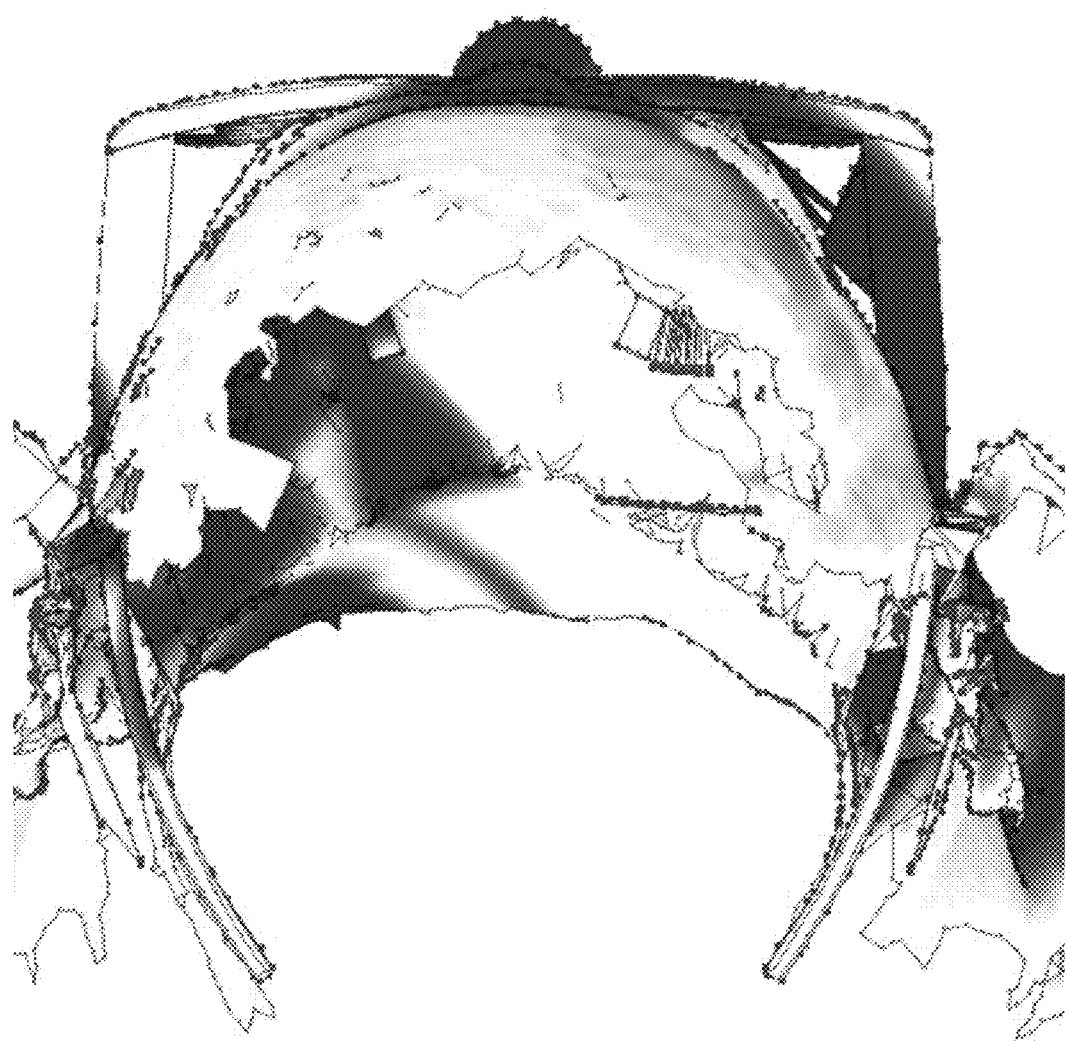
FIG. 5E is a top plan view that shows a fifth aspect of the representation model of FIG. 5A.

FIG. 5C shows a third aspect 500c of virtual 3D environment 500 simulating the WHUD model 504 relative to the head model 502. In the aspect 500c, it can be determined whether the second portion 518B is incident upon the central portion of the pupil representation 506. The aspect 500c also shows simulation of a representation 522 of a temple arm is extending through a sideburn representation 512. FIG. 5D shows a fourth aspect 500d of the virtual 3D environment 500 simulating the WHUD model 504 relative to the head model 502. In the aspect 500d, it can be determined that the temple arm representation 522 is extending through the sideburn representation 512 and resting on an ear saddle of the head model 502. FIG. 5E shows a fifth aspect 500e of the simulation of the WHUD model 504 relative to the head model 502. In the aspect 500e, it can be determined that the temple arm representation 522 is extending through the sideburn representation 512 and resting on an ear saddle of the head model 502.

Figure 6:
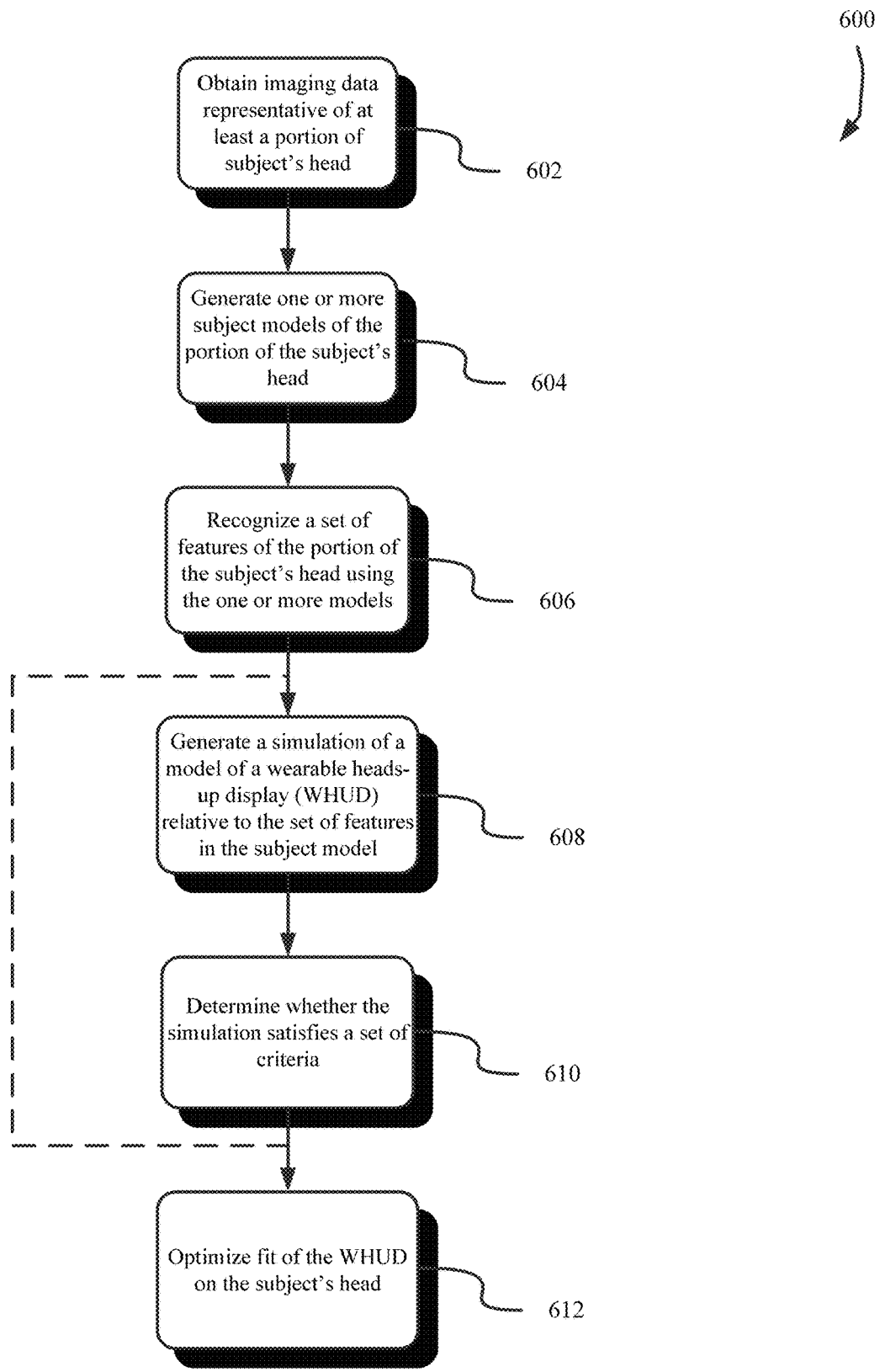
FIG. 6 is a flow diagram illustrating a computer-implemented algorithm or method for determining a fit of a wearable heads-up display to the subject's head according to one or more implementations.

FIG. 6 shows a computer-implemented method 600 for automatically determining a fit of the WHUD 100 to the subject's head 302 according to one or more implementations. The method 600 may be performed by one or more appropriate processor-based systems described herein, such as the system 320, and may involve one or more remotely located processor-based systems, such as the remote system 328. The method 600 includes obtaining 602 imaging data 318 representative of at least a portion of the subject's head 302. Obtaining 602 may include one or more operations described herein, for example, with respect to FIGS. 3, 4, and 7. For instance, obtaining 602 imaging data 318 may include providing instructions to the subject guiding the subject to allow the plurality of cameras 306 to capture sets of images of portions of the subject's head 302. The cameras 306 may be arranged on left and right sides of the subject to capture imaging data 318 obtained may include data representative of eyes and ears of the subject. In some implementations, one or more cameras may be positioned in front of the subject within the subject's field of view. The imaging data 318 may be captured in accordance with the method 700 described below.

Next, at 604, the system 320 may generate, or otherwise cause to be generated, one or more subject models of at least a portion of the subject's head 302 according to one or more implementations. The one or more subject models are generated using the imaging data 318 obtained in 602 and described elsewhere herein. In some implementations, the system 320 may generate 604 the one or more subject models using the imaging data 318. In some implementations, the one or more subject models may be generated by the remote system 328 using imaging data 318 provided by the system 320. For example, the system 320 may send the imaging data 318 to the remote system 328, which uses the imaging data 318 to generate the one or more subject models and provides or otherwise makes available the one or more subject models to the system 320. Generating 604 one or more subject models 502 of the subject's head 302 is described in greater detail, for example, with reference to FIG. 3.

In connection with generating 604 the one or more subject models 502, a plurality of images (or portions thereof) of the imaging data 318 may be combined to generate the one or more subject models 502. For instance, a first image from a first camera of the cameras 306 in a first position may be combined with one or more other images from other cameras of the cameras 306 (and/or with one or more other images from the same first camera in one or more different positions if the first camera is movable/displaceable) to generate a three-dimensional model of at least a portion of the subject's head 302. The subject models 502 generated may include information representative of peripheral surfaces and features of the head 302, including skin, eyes, ears, eyelashes, and hair.

The method 600 includes recognizing 606 a set of features in at least one subject model of the one or more subject models 502 generated in 602 (which may, in some implementations, include recognizing such feature(s) in at least one two-dimensional image from which the model was compiled and locating such feature in the model). The set of features recognized 606 include pupil centers of representations of both the left eye and the right eye of at least one of the subject models 502. In some implementations, the set of features recognized 606 include recognizing at least a portion of the sideburn representations 512 in the at least one subject model 502. Recognizing 606 the set of features may include recognizing, in a plurality of the subject models 502, regions corresponding to the representations of the eyelashes. Recognizing 606 the set of features may include processes described elsewhere herein, such as subject matter described with respect to FIGS. 5A through 5E, and FIG. 8.

Next, the method 600 includes positioning, in a virtual environment, a the WHUD model 504 and at least one of the subject models 502 relative to each other using the set of features recognized. Positioning 608 may be performed by an appropriate processor-based system, such as the system 320, and may be remotely performed by the remote system 328 in some implementations. The virtual environment is a three-dimensional computational environment of the system 320 (or remote system 328 when applicable) in which the WHUD model 504 and one or more subject models 502 can be implemented. In the virtual environment, respective models can be moved, rotated, and oriented to position parts of the models, including the representations 518 of the optical path, relative to each other to determine whether a configuration of a WHUD 100 corresponding to the WHUD model 504 would constitute a fit for the subject's head 302. Positioning may include moving one or both models in the three-dimensional virtual environment (i.e., moving model in an X-direction, a Y-direction, and/or a Z-direction) and/or rotating one or both models in the three-dimensional virtual environment (i.e., rotating model about an X-axis, a Y-axis, and/or a Z-axis).

Positioning 608 the WHUD model 504 may include obtaining WHUD data 330 regarding one or more WHUD configurations from the memory 324. The WHUD data 330 regarding the one or more WHUD configurations may be used to generate one or more corresponding WHUD models 504 that are representative of actual configurations of the WHUD 100 available to consumers. As described with respect to FIGS. 5A through 5E, the WHUD models 504 are sized and shaped to correspond to the size and shape of actual configurations of the WHUD 100, and include optical path representations 518 corresponding to the configuration of the optical equipment (e.g., optical splitter 150, SLP 120, holographic combiner 130) of the configuration of the actual WHUD 100. In some implementations, data corresponding to the WHUD models 504 may be stored in the memory 324 such that it is not necessary to generate the WHUD models 504 for every simulation.

Figure 8:
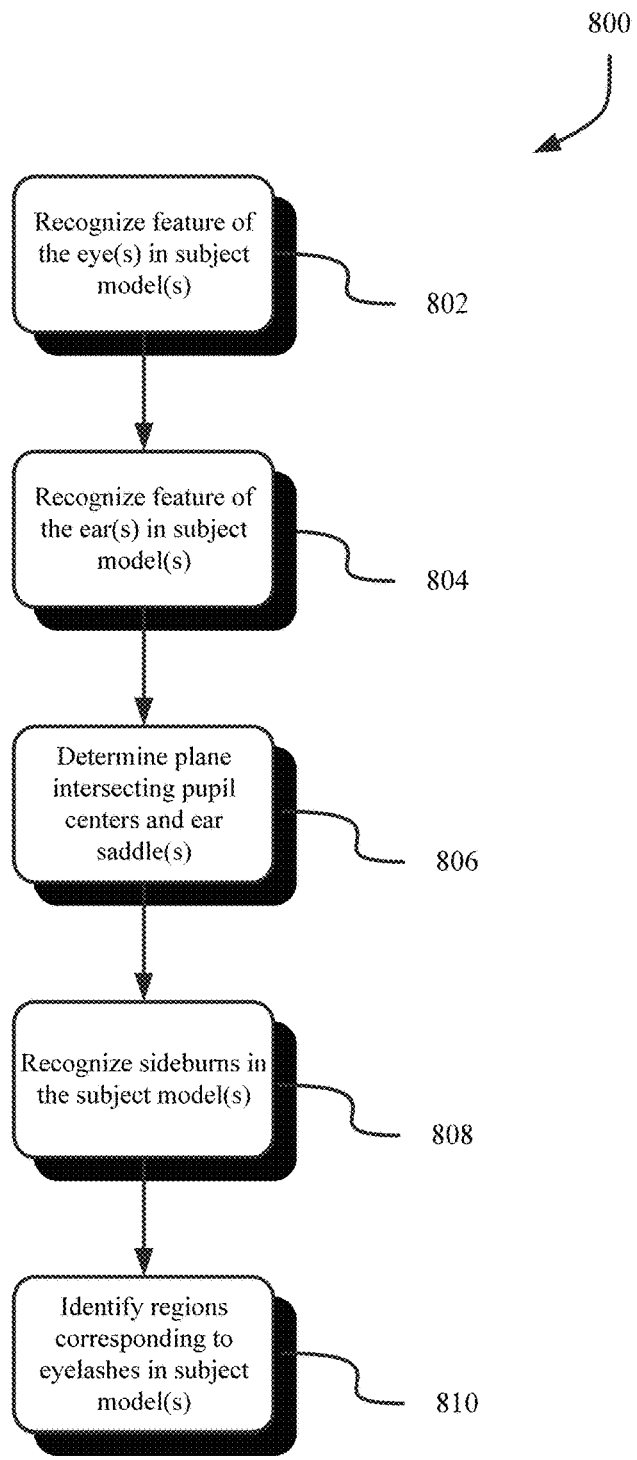
FIG. 8 is a flow diagram illustrating a computer-implemented algorithm or method for recognizing a set of features in one or more subject models according to one or more implementations.

Positioning 608 the models relative to each other comprises generating, in a virtual 3D environment of the system 320 or the remote system 328, the WHUD model 504 and the subject model 502 in the virtual environment and positioning one or both of the models using the set of features recognized. The subject model 502 The WHUD model 504 is positioned in the virtual 3D environment with temple arm representations 520 between the head representation and corresponding left and right ear representations 510 with the eyeglass lenses of the WHUD model 504 positioned in front of corresponding left and right eye representations of the subject model 502. Information regarding the glasses plane determined for the subject model 502, as described herein with respect to FIG. 8, is obtained and used to determine a fit, if any, of the WHUD model 504 to the subject model 502. For example, the glasses plane intersecting at least one pupil center and the ear saddles is superimposed on the subject model 502. Alternatively, the glasses plane intersecting both pupil centers and at least one ear saddle may be used. The simulation includes updating the position and/or orientation of at least one of the WHUD model 504 and the subject model 502 to align features of the WHUD model 504 with the corresponding recognized features of the subject model 502. In particular, the system 320 (or remote system 328) attempts to align the center of the second portion 518B of the optical path representation 518 with a pupil center of the corresponding the pupil representation 506 and attempts to align temple support portions of the temple arm representations 522 with corresponding ear saddles of the ear representations 510.

Updating the position and/or orientation of the at least one of the WHUD model 504 and the subject model 502 may include positioning portions of the temple arm representations 522 within the sideburn representations 512 of the subject model 502. As described below, the system 320 (or the remote system 328 where appropriate) includes executable instructions that implement hair detection algorithms, skin map algorithms, and/or machine learning segmentation models that facilitate accurate detection of the size and shape of the sideburns. The system 320 recognizes at least some boundaries defining the sideburn representations 512 and may position the WHUD model 504 with the temple arm representations 522 extending there through.

In some implementations, positioning 608 one or both models may include superimposing a representation of the region or volume in the models 502 of the outer boundaries of the respective eyelash representations identified in 810 of the method 800 described below. For instance, the system 320 may position, in the virtual 3D environment thereof, the eyelash regions in corresponding regions around the right and/or left eye representations of the subject model 502. Upper eyelash regions may be positioned above corresponding eye representations and lower eyelash regions may be positioned below corresponding eye representations. In some implementations, a plurality of subject models 502 may be superimposed over each other within the virtual 3D environment 500 without identifying 810 or representing eyelash regions of the eyelashes.

The method 600 proceeds to determining 610, based on positioning 608 one or both models, whether the WHUD model 504 satisfies one or more of a set of criteria for evaluating a fit of the WHUD 100 to the subject's head 302. The set of criteria is information, stored in memory, specifying conditions between features of the WHUD model 504 and the subject model 504 determinative of a fit of a corresponding configuration of the WHUD 100 to the subject's head 302. To determine whether the one or more criteria are satisfied, the system 320 (or remote system 328 when appropriate) may position and rotate the WHUD model 504 into proximity with corresponding portions of the subject model 502.

A first criterion of the set of criteria is regarding a location of a pupil centers of a pupil representation 506 relative to the second portion 518B of the optical path representation 518. The first criterion may specify that a center of the second portion 518B of the optical path representation 518 is aligned with the pupil centers of the pupil representation 506. The first criterion may specify that a set of optical rays comprising the optical path representation 518 are positioned within the pupil representation 506. The first criterion may also specify that the pupil representation 506 should be located at least at a certain distance from the holographic combiner 130, or within a certain range of distances to the holographic combiner 130. To determine whether the first criterion is satisfied, the system 320 (or the remote system 328 when appropriate) may trace individual rays of the optical path representation 518 from the optical path splitter 150 to a corresponding portion of the subject model 502.

A second criterion specifies a proximity of the temple arm representation 522 of the WHUD model 504 with the ear representation 510 of the subject model 502. In particular, the second criterion may specify that a temple support portion (i.e., corresponding to the temple support portion 112) of the temple arm representation 522 is in contact with an ear saddle of the ear representation 510.

A third criterion specifies a relation of the optical path representation 518 to the regions of the simulation corresponding to the eyelash representations. The third criterion may indicate that the first portion 518A of the optical path representation 518 minimally intersects (or avoids intersecting) with the regions corresponding to the eyelash representations. The third criterion may indicate that both the first portion 518A and the second portion 518B avoid intersecting with the regions corresponding to the eyelash representations.

As a result of the simulation satisfying one or more of the set of criteria, the system 320 may determine that a configuration of the WHUD 100 corresponding to the WHUD model 504 represents a fit for the subject's head 302. In some implementations, a determination that the configuration of the WHUD 100 represents a fit is based on satisfaction of two or more of the set of criteria—for instance, satisfaction of the first criterion and the second criterion. In some implementations, a determination that the configuration of the WHUD 100 represents a fit is based on satisfaction of all of the set of criteria.

The method 600 may be an iterative process in which various operations are repeated. For instance, after determining 610 whether the simulation satisfies the set of criteria, the method 600 may include a determination of whether there are additional WHUD models 504 corresponding to additional configurations of the WHUD 100 that have not yet been simulated in connection with the subject model 502. If so, the method 600 may return to generate 608 a simulation of another configuration of the WHUD 100. For instance, the system 320 may obtain, from the memory 324, WHUD data 330 for a different configuration of the WHUD 100 that has not yet been simulated. Then, the method 600 may proceed again to determine 610 whether the simulation satisfies one or more of the set of criteria. The system 320 may track which configurations of the WHUD 100 represent a fit for the subject. Each configuration of the WHUD 100 includes at least one component that is different than another configuration. For instance, one configuration may include a different front frame of the support structure 110 (i.e., the portion housing the eyeglass lenses 140) than another configuration. One configuration may include different temple arms 110 than another configuration such that the temple support portions 112 are in a different location relative the other configuration. One configuration may include different optical equipment (e.g., optical splitter 150, holographic combiner 130) than another configuration such that optical characteristics (e.g., optical path of light emitted) of one configuration are different than the other. As a result, the method 600 can be implemented to determine which, if any, configurations of the WHUD 100 will be an appropriate fit for the subject without evaluating the fit of every WHUD 100 configuration to the subject's head 302 in the real world. Moreover, due to the optical characteristics of the optical components of the WHUD 100, it may be difficult for the subject to realize that a WHUD 100 configuration may not constitute a good fit.

The method 600 may further include, for one or more WHUD 100 configurations determined as constituting a fit for the subject's head 302, optimizing 612 the fit of the WHUD 100 on the subject's head 302. Some configurations of the WHUD 100 may have features that can be modified to adjust the fit of the WHUD 100 to the subject's head 302. Some modifications may improve the comfort of the WHUD 100 for the subject. For instance, some temple support portions 112 of the support structure 110 may include adjustable wire cores that can be reshaped to optimize the comfort of the WHUD 100 for the subject. This may help to distribute weight of the WHUD 100 onto the subject's ears and away from the subject's nose. As another example, the bridge 114 or nose pads 116 thereof may be modified to optimize comfort of the WHUD 100.

The subject may be presented with one or more simulations of WHUD models 504 on the subject model 502 simulating respective configurations of WHUD 100 determined as constituting a fit for the subject. The subject may select one or more WHUD models to try on.

Figure 7:
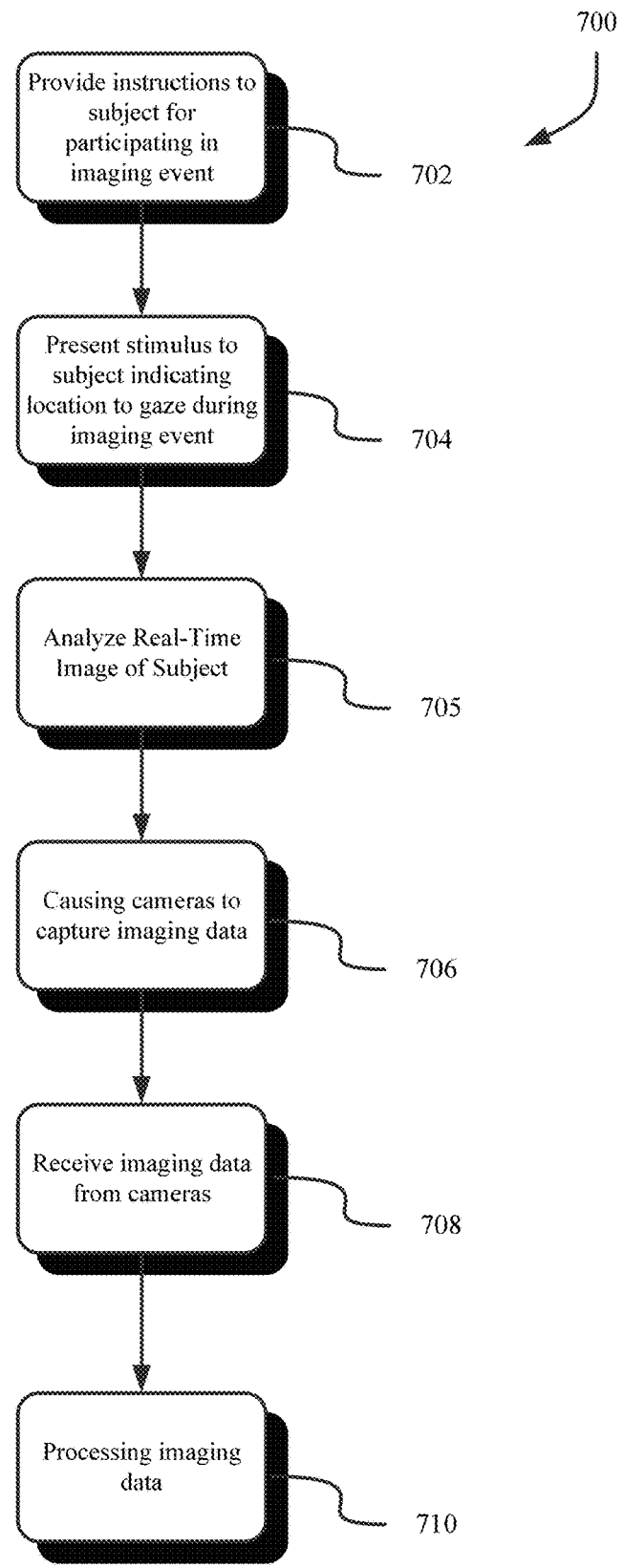
FIG. 7 is a flow diagram illustrating a computer-implemented algorithm or method for obtaining imaging data representative of a subject's head according to one or more implementations.

FIG. 7 shows a method 700 for obtaining the imaging data 318 representative of the subject's head 302 according to one or more implementations. The method 700 may be performed by one or more appropriate processor-based systems described herein, such as the system 320. The method 700 may be initiated by an authorized entity, such as an employee, tasked with operating the system 320 to determine a fit of the WHUD 100 to the subject's head 302. The method 700 may be initiated in response to the authorized entity interacting with the system 320 in a predetermined manner, such as by interacting with an input device of the system 320 to cause the one or more processors 302 to execute at least a subset of the set of instructions 306 causing the system 320 to perform the method 600 described above. The method 700 may be performed by a front portion of the system 320. For instance, one or more processor-based devices may obtain the imaging data according to the method 700, and may then provide the imaging data 318 to a back portion of the system 320 for processing. In some implementations, the front portion of the system 320 may send, over the network 326, the imaging data 318 obtained to the remote system 328 for processing along with a request to generate the one or more subject models 502.

The method 700 includes providing 702 instructions to the subject for participating in an imaging event. The imaging event corresponds to capturing, by at least a subset of the plurality of cameras 306, of a plurality of images at the same time, each image captured from a different viewpoint of the subject. In at least some implementations, the instructions are provided visually on the display 316 by rendered image(s) demonstrating an alignment of the subject's head 302 relative to the overlay 408. In some implementations, the instructions may include text and/or audio instructing the subject regarding how to position their head 302 for the imaging event. During the instructions, the image 406 of the subject's head 302 may be continuously or repeatedly displayed to the subject on the display 316 to provide feedback enabling the capture of appropriate imaging data 318.

The system 320 may then present 704, or otherwise cause to be presented, stimulus to the subject indicating a location to gaze during the imaging event. Presenting 704 the stimulus may include causing a particular indicator 402 to illuminate or causing an indication of a particular location to gaze on the display 316. The stimulus presented to the subject is dependent upon the imaging event about to occur. For instance, the system 320 may cause illumination of the indicator 402A in connection with an imaging event for capturing a set of imaging data wherein the subject's gaze is directed to a particular point above the display 316. In some instances, where the subject is to gaze straight ahead, no stimulus may be provided to the subject; instead, the instructions 410 may instruct the subject to look straight ahead. In connection with presenting 704 the stimulus, the system 320 may cause an audio signal, such as a countdown or a ticking, indicating that an imaging event is about to commence.

The system 320 may then cause 706 at least a subset of the cameras 306 to capture imaging data. For instance, the system 320 may send one or more control signals to at least a subset of the cameras 306 controlling the subset to capture imaging data 318. In some implementations, control signals may be sent to camera subsystems 314 which may cause one or more cameras 306 of the subsystem 314 to capture imaging data 318. As a result of execution of the imaging event, the cameras 306 (or subset thereof) or camera subsystems 314 may then send the captured imaging data 318, which is received 708 by the subsystem 320. The imaging data 318 received may be a set of imaging data 318 to receive during the method of determining 600 a fit of the WHUD 100 to a subject's head 302. There may be a plurality of sets of imaging data 318 received, each corresponding to the subject having a different gaze position of their eyes. The method 700 may further include processing 710 the imaging data 318 received, which may include associating, in the memory 324, the imaging data 318 with an identifier of the subject, time and date information indicating the time and date at which the imaging data 318 was obtained, and information identifying a gaze position that the subject should have during obtaining the imaging data 318.

In some implementations, the method 700 may include analyzing a real-time image of the subject. One of the first set of cameras 308 may obtain a real-time image 406 of the subject's face, as shown in FIGS. 4A through 4D. The real-time image 406 may be analyzed to determine whether the position and orientation of the real-time image 406 satisfies a set of criteria for capturing the imaging data 318. In particular, the set of criteria for capturing the imaging data 318 includes first criteria indicating alignment of the ear saddles of the image 406 with the first portions 412 of the overlay 408 and second criteria indicating that the pupils of the image 406 are within the second portions 416 of the overlay 408. As a result of the real-time image 406 satisfying the first criteria and the second criteria, the system 320 cause 706 the cameras 306 to capture the imaging data 318. In some implementations, however, causing 706 the cameras 306 to capture the imaging data 318 may be performed in response to receiving a manual user input to capture imaging data 318—for instance, by receiving a signal indicating that a particular user interface button has been selected. Alternatively, causing 706 the cameras 306 to capture the imaging data 318 may be performed automatically using a pupil tracking/pupil stability subsystem to determine when the user has switched their gaze to the next point. The method 700 may be a process that is iteratively performed to execute multiple imaging events, each of which corresponding to the subject gazing at a different location with their head 302 maintained in the same position. In a first iteration, for example, the method 700 may include providing 702 instructions, presenting 704 stimulus, and capturing 706 imaging data 318 corresponding to the subject gazing with their eyes upward at a particular point (e.g., indicator 402A). In a second iteration, the method 700 may include providing 702 instructions, presenting 704 stimulus, and capturing 706 imaging data 318 corresponding to the eyes of the subject gazing straight ahead. In a third iteration, the method 700 may include providing 702 instructions, presenting 704 stimulus, and capturing 706 imaging data 318 corresponding to the eyes of the subject looking downward at a particular point (e.g., the indicator 402B). Additional iterations may be provided to capture imaging data 318 corresponding to the subject gazing upward and/or downward at other particular locations in, above, and/or below the display 316. In some implementations, fourth and fifth iterations may be performed with the subject gazing downwardly at two separate locations below the display 316 to capture imaging data 318. Capturing imaging data 318 with the subject gazing upward and downward enables the determination of regions corresponding to the eyelashes of the subject, which may interfere with light emitted by the optical splitter 150, as described herein. Furthermore, other processes, such as generating 604 one or more subject models of the subject's head 302, may be performed between successive imaging events by the cameras 306. It is noted that the subject is instructed to maintain their head 302 in the same or approximately the same position during the process of capturing imaging data. Accordingly, the subject should only move their eyes to corresponding gaze positions without moving their head 302 during the process of obtaining the imaging data 318.

FIG. 8 shows a method 800 for recognizing a set of features in the one or more subject models 502 according to one or more implementations described herein. The method 800 may be performed in connection with or as part of recognizing 606 the set of features in the method 600. The method 800 may include recognizing 802 features of the eyes in at least one of the one or more subject models 502. In particular, the system 320 may recognize, in at least the in-plane model, a pupil center in the pupil representations 506 respectively of the left eye and the right eye of the subject model 502. Recognizing the pupil centers may include determining and recording, in the memory 324, coordinates of at least the in-plane model corresponding to the pupil center of the left eye and coordinates of at least the in-plane model corresponding to the pupil center of the right eye.

The method 800 also includes recognizing 804 features of one or both ears in at least one of the subject models 502. More particularly, the system 320 may recognize, in at least the in-plane model, an ear saddle of one or both of the ear representations 510. Recognizing the ear saddles may involve identifying regions in at least the in-plane model between an ear and the side of the head that would support the support structure 110 of the WHUD 100 (e.g., the temple portions of the support structure 110 of the WHUD). The system 320 may use the location of the first portions 412 relative to features in the imaging data 318 captured to recognize the ear saddles. The set of instructions 306 may include executable instructions encoding algorithms for recognizing the ear saddles and the pupil centers. In some implementations, it may be sufficient to recognize 606 three features: the pupil center of the left eye, the pupil center of the right eye, and one of the ear saddles.

Next, the method 800 includes determining 806 a plane intersecting the pupil centers and at least one of the ear saddles recognized in 802 and 804. The plane defining intersection of the pupil centers and the at least one ear saddle is also referred to herein as the glasses plane. Using the recognized features of the ear saddles and the pupil centers, the system 320 determines the glasses plane intersecting with the pupil centers and at least one of the ear saddles. As one example, determining the glasses plane may include identifying, by the system 320, an axis extending between the pupil centers. Then, the system 320 may determine the glasses plane having an angle relative to the axis of the pupil centers intersecting with one or both of the ear saddles. This is, however, a non-limiting example illustrating how the intersecting plane may be determined; other processes and operations of determining the intersecting plane are considered as being within the scope of the present disclosure.

The method 800 may also include recognizing 808 sideburns in at least one subject model 502. Specifically, the system 320 may identify the sideburn representations 512 in at least the in-plane model. The system 320 may then use the glasses plane determined in 806 to determine regions along the glasses plane in the in-plane model that correspond to the sideburns. These regions are regions in which the WHUD model 504 can pass through in the simulation described herein.

The method 800 may further include identifying 810 regions in a plurality of subject models 502 corresponding to eyelash representations. Identifying 810 may include determining, in each of the subject models 502, a region corresponding to upper eyelashes and/or a region corresponding to lower eyelashes of the eyelash representations. For each of the upper eyelash representations and the lower eyelash representations, the system 320 may define a region or volume in the models 502 in which outer boundaries of the respective eyelash representations may occupy. These regions correspond to regions around the subject's eyes that the subject's eyelashes may occupy and interfere with the light emitted by the optical splitter 150 of the WHUD 100. The system 320 may identify these regions by determining and storing, in the memory 324, a set of coordinates corresponding to the regions for each of the upper set and lower set of the eyelashes of one or both of the left eye and right eye of the subject models 502.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A computer-implemented method of automatically determining a fit of a wearable heads-up display (WHUD) to a head of a subject, the method comprising:
    obtaining one or more subject models respectively representative of at least a portion of the head;
    recognizing a set of features of at least one subject model of the one or more subject models;
    positioning, in a virtual environment, a model representative of the WHUD and the at least one subject model relative to each other using the set of features, wherein the model representative of the WHUD includes a representation of a light signal emitting portion of the WHUD; and
    determining whether positioning of the model representative of the WHUD relative to the at least one subject model satisfies one or more of a set of criteria for evaluating the fit of a WHUD on the head of the subject.

2. The method of claim 1 wherein recognizing the set of features includes:
    recognizing a pupil center of a representation of an eye of the at least one subject model, and
    recognizing an ear saddle point of a representation of an ear of the at least one subject model.

3. The method of claim 2 further comprising determining one or more optical paths of one or more corresponding light signals that would be emitted from the light signal emitting portion.

4. The method of claim 3, the method further including adjusting a position of the representation of the WHUD to align a temple support portion of a representation of a temple arm of the WHUD with the ear saddle point of the representation of the ear and to align the optical path to be incident upon the representation of the eye.

5. The method of claim 3 wherein the set of criteria include criteria regarding alignment of the optical path with the representation of the pupil center in conjunction with alignment of a temple support portions of the model of the WHUD with the ear saddle point of the representation of the ear, the method further comprising determining that the model of the WHUD represents a fit of the WHUD for the subject based at least in part on satisfaction of the criteria.

6. The method of claim 1 wherein recognizing the set of features of the at least one subject model includes recognizing representations of sideburns in the at least one subject model, and positioning the model representative of the WHUD includes positioning representations of temple arms of the model of the WHUD at least partially within the respective representations of sideburns.

7. The method of claim 1 wherein obtaining the one or more subject models includes obtaining a plurality of subject models representative of the eyes of the subject in a plurality of gaze positions, and wherein recognizing the set of features includes:
    recognizing representations of eyelashes of at least one of a left eye and a right eye in the plurality of subject models, and
    determining an eyelash region corresponding to the representations of the eyelashes of the at least one of the left eye and the right eye in the plurality of subject models.

8. The method of claim 7 wherein the model representative of the WHUD includes a representation of a light signal emitting portion of the WHUD, the method further comprising determining one or more optical paths of one or more corresponding light signals that would be emitted from the light signal emitting portion, wherein the set of criteria includes criteria regarding avoidance of the representation of the optical path with the eyelash region.

9. The method of claim 1, further comprising:
    positioning, in the virtual environment, a second model representative of a different configuration of the WHUD relative to the at least one subject model, the second model having a different size or shape than the model representative of the WHUD; and
    determining whether positioning of the second model satisfies the set of criteria for evaluating the fit of a WHUD on the head of the subject.

10. The method of claim 9 further comprising determining whether the different configuration of the WHUD represents a better fit than the model of the WHUD based at least in part on the set of criteria.

11. The method of claim 1 further comprising receiving imaging data representative of at least a portion of the head of the subject, wherein obtaining the one or more subject models includes generating the one or more subject models based at least in part on the imaging data.

12. The method of claim 1 further comprising:
    sending, over a network, a request to a remote processor-based system to provide the one or more subject models; and
    receiving, in response to the request, the one or more subject models.

13. The method of claim 1 further comprising causing a display of an overlay including a pair of first portions representative of eyeglass lenses of the WHUD and a pair of second portions representative of temple arms of the WHUD.

14. The method of claim 13 wherein causing the display of the overlay includes causing the overlay to be superimposed relative to a real-time image of the head of the subject, the method further comprising providing instructions directing the subject to position the head of the subject at a location and orientation matching the overlay.

15. The method of claim 14 further comprising causing, subsequent to providing the instructions, a at least one camera to capture a set of images corresponding to imaging data representative of the head of the subject.

16. The method of claim 1 further comprising obtaining imaging data representative of at least eyes and ears of the subject, the imaging data including information representative of one or more gaze positions of eyes of the subject.

17. The method of claim 16 wherein obtaining the imaging data includes causing at least one camera to capture a set of images.

18. The method of claim 16 wherein obtaining the imaging data includes providing one or more indications of locations at which the subject is to gaze during an imaging event.

19. A system for determining a fit of a wearable heads-up display (WHUD) to a head of a subject, the system comprising:
   one or more processors; and
   memory storing a set of instructions that, as a result of execution by the one or more processors, cause the system to:
      obtain one or more subject models respectively representative of the at least a portion of the head;
      recognize a set of features in at least one subject model of the one or more models;
      position, in a virtual environment of the system, a model representative of the WHUD and the at least one subject model relative to each other using the set of features, wherein the model representative of the WHUD includes a representation of a light signal emitting portion of the WHUD; and
      determine whether a position of the model representative of the WHUD relative to the at least one subject model satisfies one or more of a set of criteria for evaluating the fit of a WHUD on the head of the subject.

20. A non-transitory computer-readable storage medium having computer-executable instructions stored thereon that, as a result of being executed, cause at least one computer processor of a system to:
   obtain one or more subject models respectively representative of the at least a portion of the head;
   recognize a set of features in at least one subject model of the one or more models;
   position, in a virtual environment of the system, a model representative of a wearable heads-up display/WHUD) and the at least one subject model relative to each other using the set of features, wherein the model representative of the WHUD includes a representation of a light signal emitting portion of the WHUD; and
   determine whether a position of the model representative of the WHUD relative to the at least one subject model satisfies one or more of a set of criteria for evaluating the fit of a WHUD on the head of the subject.

* * * * *